(12) United States Patent
Inoue et al.

(10) Patent No.: US 8,256,908 B2
(45) Date of Patent: Sep. 4, 2012

(54) ANTIGLARE FILM, ANTIREFLECTIVE FILM, POLARIZING PLATE AND IMAGE DISPLAY DEVICE

(75) Inventors: Katsumi Inoue, Minami-Ashigara (JP); Takato Suzuki, Minami-Ashigara (JP); Daiki Wakizaka, Minami-Ashigara (JP); Tetsuya Asakura, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 68 days.

(21) Appl. No.: 12/569,472

(22) Filed: Sep. 29, 2009

(65) Prior Publication Data

US 2010/0079869 A1      Apr. 1, 2010

(30) Foreign Application Priority Data

Sep. 30, 2008  (JP) ............................... P2008-255441

(51) Int. Cl.
G02B 27/00      (2006.01)
(52) U.S. Cl. ........................................................ 359/601
(58) Field of Classification Search .................. None
See application file for complete search history.

(56) References Cited

U.S. PATENT DOCUMENTS

| | | | | |
|---|---|---|---|---|
| 7,857,468 | B2 * | 12/2010 | Chen et al. ..................... | 359/601 |
| 2003/0021917 | A1 | 1/2003 | Hotaka et al. | |
| 2004/0263965 | A1 | 12/2004 | Honda | |
| 2005/0152034 | A1 | 7/2005 | Matsunaga | |
| 2007/0121211 | A1* | 5/2007 | Watanabe et al. ............. | 359/601 |
| 2007/0139781 | A1 | 6/2007 | Inoue et al. | |
| 2007/0237966 | A1 | 10/2007 | Takao et al. | |
| 2007/0242362 | A1 | 10/2007 | Takada et al. | |
| 2008/0137204 | A1 | 6/2008 | Yoshinari et al. | |
| 2008/0218865 | A1 | 9/2008 | Iwata et al. | |
| 2009/0021834 | A1 | 1/2009 | Iwata et al. | |
| 2009/0052043 | A1 | 2/2009 | Iwata et al. | |
| 2009/0061165 | A1 | 3/2009 | Iwata et al. | |

(Continued)

FOREIGN PATENT DOCUMENTS

JP            11-109113 A         4/1999

(Continued)

OTHER PUBLICATIONS

Japanese Office Action, dated May 15, 2012, for Japanese Application No. 2008-255441.

*Primary Examiner* — Derek S Chapel
(74) *Attorney, Agent, or Firm* — Birch, Stewart, Kolasch & Birch, LLP

(57) ABSTRACT

An antiglare film is provided, the antiglare film including: a support; and an antiglare layer including a surface that has asperities, wherein the antiglare layer contains at least first light-transmitting particles and second light-transmitting particles, the first light-transmitting particles have an average particle size that is 0.01 to 2.5 μm greater than an average thickness of the antiglare layer, the second light-transmitting particles have an average particle size that is at least 0.1 μm smaller than the average thickness of the antiglare layer, the first light-transmitting particles are contained in an amount of 0.1 to 2 mass % based on a total solid content in the antiglare layer, the second light-transmitting particles are contained in an amount of 2 to 30 mass % based on the total solid content in the antiglare layer, and the second light-transmitting particles include organic polymer-containing particles each of which has a core particle/shell layer structure.

17 Claims, 2 Drawing Sheets

U.S. PATENT DOCUMENTS

| | | | |
|---|---|---|---|
| 2009/0091835 A1* | 4/2009 | Wakizaka et al. | 359/586 |
| 2010/0091374 A1 | 4/2010 | Iwata et al. | |
| 2010/0252202 A1 | 10/2010 | Iwata et al. | |
| 2010/0255291 A1 | 10/2010 | Iwata et al. | |
| 2012/0002397 A1 | 1/2012 | Iwata et al. | |

FOREIGN PATENT DOCUMENTS

| | | |
|---|---|---|
| JP | 2000-121809 A | 4/2000 |
| JP | 2002-113803 A | 4/2002 |
| JP | 2003-183586 A | 7/2003 |
| JP | 2003-248110 A | 9/2003 |
| JP | 2004-170901 A | 6/2004 |
| JP | 2005-17920 A | 1/2005 |
| JP | 2006-227279 A | 8/2006 |
| JP | 2007-188070 A | 7/2007 |
| JP | 2007-199409 A | 8/2007 |
| JP | 2007-322779 A | 12/2007 |
| JP | 2008-46497 A | 2/2008 |
| JP | 2008-90263 A | 4/2008 |
| JP | 2008-145499 A | 6/2008 |
| JP | 2008-209855 A | 9/2008 |
| WO | WO 2006/088204 A1 | 8/2006 |

* cited by examiner

ANTIGLARE FILM, ANTIREFLECTIVE FILM, POLARIZING PLATE AND IMAGE DISPLAY DEVICE

BACKGROUND OF THE INVENTION

1. Field of the Invention

The present invention relates to an antiglare film, an antireflective film, a polarizing plate and an image display device.

2. Description of the Related Art

In a variety of image display devices, such as a liquid crystal display (LCD), a plasma display panel (PDP), an electroluminescent display (ELD) or a cathode ray tube display (CRT), antiglare film or antiglare antireflective film is used at each individual display surface for the purpose of preventing a contrast drop caused by reflections of extraneous light from the display surface and surroundings' reflection in the display screen. These image display devices are widely used in office and home environments, and an improvement in antiglare capability, or the capability of preventing indoor fluorescent lamps and viewers from being reflected in the display screen, and a further improvement in display contrast in well-lit rooms are required of them (see JP-A-2004-170901 for example).

By addition of light-transmitting particles to its antiglare layer, an antiglare film can utilize two functions, namely an antiglare function attributed to the scattering of light from asperities that the light-transmitting particles form on the antiglare layer surface (surface scatter capability), and a light-scattering function arising from a refractive index difference between each light-transmitting particle and light-transmitting resin in the antiglare layer (internal scatter capability).

In the case of imparting the antiglare function arising from the surface scatter capability, there however occur problems that an image display screen looks whitish because of its surface scatter capability, resulting in deterioration of a deep-black feel, and glitter traceable to lens effects produced by asperities on the layer surface becomes worse.

The internal scatter capability is utilized for the purpose of improving glitter and viewing angle characteristics of contrast, but when the scattering of light is excessive, there occurs a drawback of lowering display contrast. On the other hand, when the scattering of light is too little, there occurs a problem that glitter becomes worse. Therefore, moderate scattering of light on the inside is required. In order to impart a moderate internal scatter capability, a difference in refractive index is required to be made between each of the light-transmitting particles and the light-transmitting resin.

When a difference in refractive index is made between each of the light-transmitting particles and light-transmitting resin used in the antiglare layer for the purpose of imparting the internal scatter capability, it is preferred that the resin constituent in the light-transmitting particles be made different from the resin constituent in the light-transmitting resin. However, the use of different resin constituents causes a problem that aggregation of light-transmitting particles is apt to occur in light-transmitting resin because of weak affinity between the light-transmitting particles and the light-transmitting resin; as a consequence, surface unevenness become too great, and thereby deterioration of denseness of black is caused.

On the other hand, it is also possible to use antireflective film at the topmost surface of which a low refractive index layer is provided as a thin-film layer about 100 nm in thickness and antireflection is performed by optical interference of the low refractive index layer. And antireflective films offered with the intention of further lowering the reflectance include those of multilayer thin-film interference type which prevent reflection by optical interference of multiple layers, such as an antireflective film of two-layer thin-film interference type which has a high refractive index layer between a transparent support and a low refractive index layer, and an antireflective film of three-layer thin-film interference type which has a medium refractive index layer and a high refractive index layer provided in order of mention between a transparent support and a low refractive index layer. In particular, the antireflective film of three-layer thin-film interference type is suitable for the purpose of preventing reflection over a wide wavelength range and thereby achieving low reflectance while minimizing reflected colors.

As the thin-film layers (a high refractive index layer, a medium refractive index layer and a low refractive index layer) used in an antireflective film of multilayer thin-film interference type, multilayer film formed as lamination of transparent thin-film layers of metal oxides has been widely used so far. In general, formation of transparent thin films of metal oxides has been carried out using e.g. a chemical vapor deposition method (CVD) or a physical vapor deposition method (PVD), notably a vacuum evaporation method or a sputtering method as one type of physical vapor deposition method.

However, formation of transparent thin films of metal oxides by use of a vapor deposition or sputtering method is low in productivity and not suitable for mass production. Accordingly, wet film-forming methods, notably a method of forming film by coating, have been offered.

For the purpose of improving surroundings' reflection and denseness of black, it is favorable to form an antireflective layer of two-layer or three-layer thin-film interference type on an antiglare layer. However, when it is tried to coat an uneven surface of an antiglare layer with thin films on a nanometer scale, there may be cases where, since the uneven surface of the antiglare layer gives rise to uneven coating and repelling, the films formed cannot have uniform thickness and optimum optical interference does not occur as it is designed; as a consequence, reflectance is not lowered. Accordingly, it is difficult to achieve both low reflection and high antiglare properties at the same time.

On the other hand, there is an introduction to the technique of incorporating core/shell particles in a hard coating layer (JP-A-2003-183586). Although it discloses the art of lowering the density of cross-links in a shell portion by specifying a glass transition temperature of the shell, JP-A-2003-183586 has no disclosure about impartment of a light-scattering capability without roughening the antiglare layer surface for the purpose of providing on an antiglare layer a uniform antireflective layer of thin-film interference type, so further improvements are required.

Additionally, when it is tried to impart the internal scatter capability by use of light-transmitting particles in an antiglare layer, it is necessary to make a refractive index difference between each light-transmitting particle and light-transmitting resin of the antiglare layer, so light-transmitting particles formed of a material different from the light-transmitting resin are used as the particles causing internal scattering of light. In this case, however, since the affinity between the light-transmitting particles and the light-transmitting resin is weak, the light-transmitting particles cause aggregation in the light-transmitting resin and form uneven spots on the layer surface. As a result, there occur problems that the antiglare layer suffers deterioration in a feel of denseness of black and the antireflective film formed thereon cannot have uniform thickness because of uneven coating and repelling of each thin-film layer, and cannot achieve a reflectance drop.

SUMMARY OF THE INVENTION

An object of the invention is to provide an antiglare film having excellent anti-glare and anti-glitter capabilities and ensuring high denseness of black. Another object of the invention is to provide an antireflective film not only ensuring excellent anti-glare and anti-glitter capabilities and high denseness of black, but also having a low reflectance. A further object of the invention is to provide a polarizing plate and an image display device each incorporating such an antiglare film or antireflective film.

As a result of our intensive studies, it has been found that the problems can be solved by acquiring the following aspects, and thereby the objects of the invention can be achieved.

1. An antiglare film, including:
   a support; and
   an antiglare layer including a surface that has asperities, wherein
   the antiglare layer contains at least two kinds of light-transmitting particles including first light-transmitting particles and second light-transmitting particles,
   the first light-transmitting particles have an average particle size that is 0.01 to 2.5 µm greater than an average thickness of the antiglare layer,
   the second light-transmitting particles have an average particle size that is at least 0.1 µm smaller than the average thickness of the antiglare layer,
   the first light-transmitting particles are contained in an amount of 0.1 to 2 mass % based on a total solid content in the antiglare layer,
   the second light-transmitting particles are contained in an amount of 2 to 30 mass % based on the total solid content in the antiglare layer, and
   the second light-transmitting particles include organic polymer-containing particles, each of the organic polymer-containing particles has a core particle/shell layer structure in which a core particle and a shell layer are contained.
2. The antiglare film as described in item 1 above,
   wherein the first light-transmitting particles are contained in an amount of 0.1 to 1 mass % based on the total solid content in the antiglare layer.
3. The antiglare film as described in item 1 or 2 above,
   wherein the shell layer in the core particle/shell layer structure of each of the organic polymer-containing particles has a thickness of 10 nm to 2,000 nm.
4. The antiglare film as described in any of items 1 to 3 above,
   wherein a refractive index $n_1$ is higher than a refractive index $n_2$, where the refractive index $n_1$ represents a refractive index of the core particle and the refractive index $n_2$ represents a refractive index of the shell layer, and
   the refractive index $n_1$ is from 1.54 to 1.65.
5. The antiglare film as described in any of items 1 to 4 above,
   wherein the refractive index $n_2$ is from 1.46 to 1.53.
6. The antiglare film as described in any of items 1 to 5 above,
   wherein the shell layer contains at least one polymer selected from the group consisting of polymers of acrylic acid esters, polymers of methacrylic acid esters, and copolymers of acrylic acid esters and methacrylic acid esters.
7. The antiglare film as described in any of items 1 to 6 above,
   wherein the antiglare layer is formed of a polymer, a copolymer or a mixed polymer of the polymer and the copolymer,
   the polymer and the copolymer are formed from at least one of following (A1) and (A2);
   (A1): an alkyl acrylate having an alkyl group that has at least a group selected from the group consisting of a hydroxyl group and an acryloyl group, and
   (A2): an alkyl methacrylate having an alkyl group that has at least a group selected from the group consisting of a hydroxyl group and an acryloyl group.
8. The antiglare film as described in any of items 1 to 7 above,
   wherein the second light-transmitting particles include particles, that have sizes at least 2 µm greater than the average particle size of the second light-transmitting particles, in a proportion of 0.01% or below based on a total amount of the second light-transmitting particles.
9. The antiglare film as described in any of items 1 to 8 above,
   wherein the surface of the antiglare film having the asperities has an arithmetic average roughness Ra within a range of 0.03 µm<Ra<0.4 µm,
   the asperities have an average interval Sm within a range of 80 µm<Sm<700 µm, and
   a region $\theta(0.5)$ in which slope angles $\theta$ of the asperities lie within a range of $0°<\theta<0.5°$ constitutes at least 40% of the surface of the antiglare layer.
10. The antiglare film as described in any of items 1 to 9 above, which has an internal haze value of 5% to 90%.
11. The antiglare film as described in any of items 1 to 10 above, which has a surface haze value of 2% or below.
12. An antireflective film, including:
    the antiglare film as described in any of items 1 to 11 above; and
    a low refractive index layer on or above the antiglare layer of the antiglare film, the low refractive index layer having a refractive index lower than a refractive index of the antiglare layer.
13. The antireflective film as described in item 12 above, further including:
    a high refractive index layer between the antiglare layer and the low refractive index layer, the high refractive index layer having a refractive index higher than the refractive index of the antiglare layer.
14. The antireflective film as described in item 13 above, further including:
    a medium refractive index layer between the antiglare layer and the high refractive index layer,
    wherein the medium refractive index layer has a refractive index higher than the refractive index of the antiglare layer and lower than the refractive index of the high refractive index layer.
15. The antireflective film as described in any of items 12 to 14 above, which has an integrated reflectance of 1.5% or below.
16. A polarizing plate, including:
    protective films; and
    a polarizing film provided between the protective films,
    wherein at least one of the protective films is the antiglare film as described in any of items 1 to 11 or the antireflective film as described in any of items 12 to 15 above.
17. An image display device, including;
    a display; and
    the antiglare film as described in any of items 1 to 11, the antireflective film as described in any of items 12 to 15 or the polarizing plate as described in item 16 above provided at outermost surface of the display.

DETAILED DESCRIPTION OF THE INVENTION

Figure 1A:
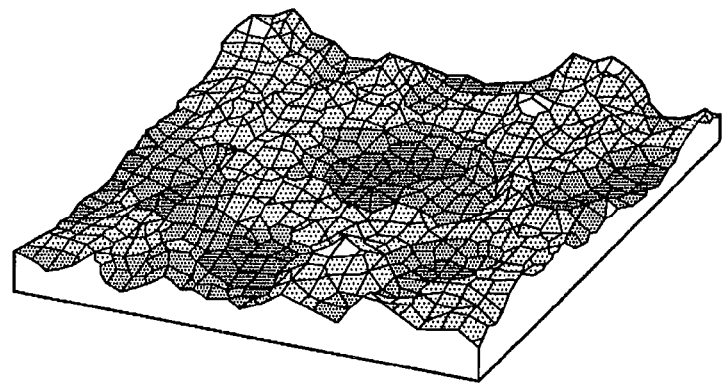
FIGS. 1A to 1C are schematic diagrams for illustrating general outlines of a method for measuring a slope angle.

The invention is described below in further detail. Additionally, when physicality values, characteristic values or so on are rep resented by numerical values in the specification, the expression of "a numerical value 1 to a numerical value 2" refers to values ranging from at least the numerical value 1 to at most the numerical value 2. In addition, the expression of "(meth)acrylate" as used in the specification means "at least either acrylate or methacrylate". And the expression of "(meth)acrylic acid" or the like has similar meaning to the above.

<Layer Structure of Antiglare Film>

The antiglare film according to the invention is an antiglare film that has on or above a transparent support an antiglare layer containing at least two kinds of light-transmitting particles and at least one kind of light-transmitting resin, wherein at least one kind of light-transmitting particles are organic polymer-containing particles with a core particle/shell layer structure.

The present antiglare film has at least one antiglare layer on or above a transparent support.

Examples of a suitable layer structure that the present antiglare film or an optical film incorporating the present antiglare film can have are given below. In each of the following structures, the term "base film" refers to a support made of a film.

Layer Structure:
Base film/antiglare layer
Base film/antistatic layer/antiglare layer
Base film/antiglare layer/low refractive index layer
Base film/antiglare layer/antistatic layer/low refractive index layer
Base film/hard-coat layer/antiglare layer/low refractive index layer
Base film/hard-coat layer/antiglare layer/antistatic layer/low refractive index layer
Base film/hard-coat layer/antistatic layer/antiglare layer/low refractive index layer
Base film/antiglare layer/high refractive index layer/low refractive index layer
Base film/antiglare layer/medium refractive index layer/high refractive index layer/low refractive index layer
Antistatic layer/base film/antiglare layer/medium refractive index layer/high refractive index layer/low refractive index layer
Base film/antistatic layer/antiglare layer/medium refractive index layer/high refractive index layer/low refractive index layer
Antistatic layer/base film/antiglare layer/high refractive index layer/medium refractive index layer/high refractive index layer/low refractive index layer The present antiglare film and antireflective film may be also coated with layers other than the antiglare layer and antireflective layer, respectively. Examples of such layers include a soil-resistant layer in addition to the layers as recited above. On the other hand, it is preferable that at least either the antiglare layer or the antireflective layer also has another function as a hard-coat layer, an antistatic layer, a soil-resistant layer or so on. Incorporation of those layers into the present antiglare film allows favorable uses as optical films.

From the viewpoint of achieving low reflections, it is advantageous for the present antireflective film to have a low refractive index layer on an antiglare layer, and the antireflective film of a layer structure containing a medium refractive index layer, a high refractive index layer and a low refractive index layer is more advantageous. Examples of a layer structure of the antireflective film include those disclosed in JP-A-8-122504, JP-A-8-110401, JP-A-10-300902, JP-A-2002-243906 and JP-A-2000-111706.

<Makeup of Antiglare Layer>

The antiglare layer contains at least first light-transmitting particles having an average particle size greater than its average thickness by 0.01 to 2.5 μm and second light-transmitting particles with a core particle/shell layer structure which contain an organic polymer and have an average particle size smaller than the average thickness of the antiglare layer by at least 0.1 μm. The antiglare layer can be formed by coating, drying and curing a coating solution containing those two kinds of light-transmitting particles, a matrix forming component (such as monomers for binder) and an organic solvent.

The coating solution used for forming the antiglare layer contains e.g. binder monomers for formation of a main matrix which serve as a raw material of light-transmitting polymer formed through curing with ionizing radiation or the like, light-transmitting particles having the specified particle sizes and a polymerization initiator, and it is preferable that the coating solution further contains a polymeric compound for viscosity adjustment, inorganic fillers for curl reduction and refractive index adjustment, coating aids and so on.

In the invention, the first light-transmitting particles are used for imparting antiglare capability. For imparting proper antiglare capability with lower incidence of asperities, and that without attended by deterioration in glitter and a rise in reflectance, the sizes and addition amount of the first light-transmitting particles are required to fall within the ranges individually specified in the invention. By satisfying this requirement, it becomes possible to heighten the proportion of flat portions at the surface while imparting the antiglare capability required, and thereby deterioration of glitter and reflectance can be prevented. On the other hand, the second light-transmitting particles are used in the invention for the purpose of imparting the internal scatter capability. Although the second light-transmitting particles are added in an amount larger than the first light-transmitting particles in order to impart an internal scatter capability to the required extent, addition to the incidence of asperities determined by the first light-transmitting particles can be checked by adjusting the particle sizes of second light-transmitting particles to be smaller than the average thickness of the antiglare layer and avoiding aggregation of the second light-transmitting particles by using organic polymer-containing particles of core particle/shell layer structure and properly choosing the shell component. Therefore, the second light-transmitting particles can impart the required internal scatter capability while keeping all of the anti-glitter and anti-glare properties and the reflectance in satisfactory conditions. When particles having a structure other than the core particle/shell layer structure are used as the second light-transmitting particles, compatibility between the internal scatter capability and the aggregation property cannot be attained, and impartment of the required internal scatter capability by those particles causes an increase in incidence of asperities on the surface and a reduction in the proportion of flat portions, resulting in a deterioration in glitter and a rise in reflectance.

The thickness of the antiglare layer is preferably from 3 μm to 40 μm, more preferably from 3 μm to 20 μm, further preferably from 5 μm to 15 μm, especially preferably from 5 μm to 10 μm. The antiglare layer 3 μm or thicker in thickness can have a proper internal scatter capability since its pencil hardness is not low and particles which are usable as the second light-transmitting particles are not limited only particles having sizes of 2 μm or below, while the antiglare layer not exceeding 40 μm in thickness does not become small in surface unevenness to result in having sufficient antiglare capability, and besides, it does not undergo deterioration in film brittleness.

The refractive index of binder can be quantitatively evaluated by direct measurement with an Abbe, refractometer, measurement on spectroscopic reflection spectra, measurement according to spectroscopic ellipsometry, or so on. The refractive index of the light-transmitting particles can be determined by preparing dispersions which are the same in amount of light-transmitting particles dispersed, but made various in refractive index by using solvent mixtures containing two kinds of solvents different in refractive index at various mixing ratios as their respective dispersion media, measuring turbidities of the dispersions, and then measuring the refractive index of the solvent mixture showing the minimum turbidity by means of an Abbe refractometer.

<First Light-Transmitting Particles>

The first light-transmitting particles used in the invention form convex parts on the antiglare layer surface by having an average particle size greater than the average thickness of the antiglare layer, and thereby an antiglare property is developed. It is advantageous for the light-transmitting particles to have an average particle size greater than the average thickness of the antiglare layer by 0.01 to 2.5 μm in point of contribution to antiglare capability. For not only imparting the desired antiglare capability but also achieving improvement in glitter and uniform stacking of a thin-film interference layer by increasing the proportion of flat portions at the antiglare layer surface, the average particle size is preferably greater than the average thickness of the antiglare layer by 0.05 to 2.0 especially by 0.2 to 1.0 μm. The average thickness of the antiglare layer can be determined by observing the antiglare film in sections under an electron microscope, measuring layer thicknesses at 30 points chosen at random, and taking an average of these measured values.

The convex parts referred to here are defined as follows. First, upon measuring of a surface profile of the antiglare layer, a binarization is executed with an average height of the antiglare layer to set boundary lines. Then the convex parts are defined as parts surrounded by the boundary lines with heights higher than the average height.

It is appropriate that each of convex parts on the antiglare layer be formed of, in a substantial sense, 5 or less light-transmitting particles, preferably one light-transmitting particle. The wording of "in a substantial sense" as used herein means that at least 90%, preferably at least 95%, of the convex parts defined above satisfy the requirement for the above preferred aspect.

As to the kind of first light-transmitting particles, selection of particles having good dispersibility is advantageous because each of convex parts is preferably formed of one light-transmitting particle in a substantial sense.

The refractive index of the first light-transmitting particles is preferably from 1.46 to 1.53, more preferably from 1.47 to 1.51, further preferably from 1.49 to 1.50. From the viewpoints of ensuring good dispersibility and avoiding redundant scattering of light, it is advantageous for the particles to have their refractive index in such a range. As the particles having good dispersibility, light-transmitting organic resin particles, such as polymethyl methacrylate particles or methyl methacrylate-styrene copolymer particles, can be used to advantage. The antiglare layer is required to have high hardness, and from this point of view, the transparent resin used for the layer matrix is preferably an acrylate resin. Therefore, the polymethyl methacrylate proportion in the copolymer particles is preferably at least 60 mass % in point of dispersibility, and polymethyl methacrylate particles are particularly preferred.

It is also preferable that the first light-transmitting particles used are organic polymer-containing particles with a core particle/shell layer structure as used for the second light-transmitting particles described hereinafter. In this case, it is especially preferred that the shell layer be formed from at least one kind of polymer chosen from polymers of acrylic acid esters, polymers of methacrylic acid esters or copolymers of acrylic acid esters and methacrylic acid esters.

As the first light-transmitting particles, it is also possible to use metal oxide particles. Although particles like silica or alumina can be used as the metal oxide particles, fine particles of cohesive metal oxide is preferably used from the viewpoints of resisting precipitation from a coating solution and causing no change in the internal scatter capability. The cohesive metal oxide particles are used in the antiglare layer for the purposes of [1] imparting surface unevenness, [2] making refractive index adjustment, [3] increasing hardness, [4] improving brittleness and curling, and so on.

For imparting surface unevenness (asperities) to the antiglare layer in the invention, cohesive silica and cohesive alumina are suitable as the cohesive metal oxide particles in terms of transparency and low price. Of these metal oxides, cohesive silica which can form aggregates of particles dozens nm in primary particle size is preferred over the others from the viewpoint of imparting moderate unevenness to the surface with stability.

The cohesive silica can be synthesized by neutralization reaction e.g. between sodium silicate and sulfuric acid, or the so-called wet method, but the synthesis method thereof is not limited to the foregoing. Although wet methods are broadly classified into a precipitation method and a gelling method, both methods may be used in the invention. The secondary particle size of the cohesive silica is preferably from 0.1 to 10.0 μm, but it is chosen in consideration of the combination with the thickness of the antiglare layer containing the secondary particles. Adjustment to the secondary particle size is made by controlling the dispersion degree (e.g. performing control by mechanical dispersion using a sand mill or the like, or by chemical dispersion using a dispersant or the like).

In the case of using those light-transmitting particles, dispersants including inorganic fillers of sizes causing no scattering of visible light, such as silica, and organic compounds (which may be monomers or polymers) may be added for the purposes of stabilizing the dispersion of particles in a binder or a coating solution and preventing the precipitation of particles.

In the case of adding an inorganic filler, the greater the amount of the filler added, the more effective the addition of filler for prevention of precipitation of light transmitting particles. However, it is appropriate that the inorganic filler be added in such an amount as not to affect adversely the transparency of the resultant coating. Therefore, it is preferred that the inorganic filler measuring 0.5 μm or below in particle size be added in such an amount as to cause no loss of transparency in the resultant coating, specifically in an amount of the order of 0.1 part by mass per 100 parts by mass of binder. On the other hand, an organic compound or the like for dispersant use is preferably added in an amount of 0.1 to 20 parts by mass per 100 parts by mass of light transmitting particles. The addition amount of the dispersant like an organic compound is preferably from 0.1 to 15 parts by mass, particularly preferably from 0.5 to 10 parts by mass. The range of addition amount as specified above is preferred because the addition in an amount of 0.1 part by mass or above can have an effect on dispersion stability and the addition in an amount of 20 parts by mass or below does not cause a problem like bleedout resulting from an increase in the component making no contribution to dispersion stability.

Additionally or alternatively, the light transmitting particles may be subjected to surface treatment for the purpose of obtaining dispersion stability and preventing precipitation in a binder or coating composition for formation of the antiglare layer. The kind of a surface treating agent used thereof is chosen appropriately according to the binder and the solvent used in combination. The suitable amount of the surface treating agent added is from 0.1 to 30 parts by mass, preferably from 1 to 25 parts by mass, particularly preferably from 3 to 20 parts by mass, per 100 parts by mass of light transmitting particles. Such an addition amount range is preferred because there occurs no shortage of the surface treatment quantity for dispersion stability so long as the amount of the surface treating agent added is 0.1 part by mass or above and a problem like bleedout resulting from an increase in the component making no contribution to dispersion stability does not occur so long as the amount of the surface treating agent added is 30 parts by mass or below.

The first light-transmitting particles having an average particle size greater than an average thickness of the antiglare layer are required to be added in an amount of 0.1 to 2 mass % based on the total solids content. And an increase in flat portions at the surface by lowering the density of asperities allows uniform stacking of thin-film interference layer(s). The addition amount of the first light-transmitting particles is preferably from 0.1 to 1 mass %, more preferably from 0.15 to 0.5 mass %, based on the total solids content. When the addition amount falls the 0.1- to 2-mass % range, it is possible to improve all of antiglare capability, glitter and reflectance. When the addition amount is not less than 0.1 mass %, the antiglare capability becomes sufficient and the resultant layer does not lose a feel of uniform film; while, when the addition amount is not beyond 2 mass %, there do not occur a deterioration in glitter and a rise in reflectance.

The light-transmitting particles having an average particle size greater than the average thickness of the antiglare layer are numbered preferably in 1 to 10,000, more preferably in 5 to 5,000, especially preferably in 10 to 1,500, per unit area $mm^2$ of the anti glare layer. The number of the light-transmitting particles is determined by observing 10 fields of view under an optical microscope, counting the number of particles in each field of view, and taking the average of the numbers counted.

<Second Light-Transmitting Particles>

In the invention, the second light-transmitting particles different in average particle size from the first light-transmitting particles are used in combination with the first light-transmitting particles for the purpose of attaining the required internal scatter capability. The antiglare layer can obtain the antiglare capability from the first light-transmitting particles and the internal scatter capability from the second light-transmitting particles. However, there may be cases where, when an antiglare antireflective film is stuck to a display, a phenomenon undesirable to quality of display image, or the so-called "glitter", occurs.

The term "glitter" as used in the invention refers to a phenomenon that, regardless of the presence or absence of glaringness by the reflection of illumination with an electric light or the like in a display, which is a subject of discussion about anti-glare properties, picture elements lose uniformity in brightness by being enlarged or reduced through the lens effect produced by asperities present on the antiglare antireflective film surface; as a result, R, G and B look glittering to human eye. This "glitter" can be significantly improved by combined use of light-transmitting particles for imparting antiglare capability and other light-transmitting particles smaller in particle size and different from a binder in refractive index.

In the invention, the use of the second light-transmitting particles in combination with the first light-transmitting particles causes a problem that asperities arising from the second light-transmitting particles are also formed on the film and the proportion of flat portions at the film surface is reduced. When the second light-transmitting particles have poor dispersibility and form large aggregates, the antiglare surface has a rough structure, and there may be cases where, when a low refractive index layer as a thin-film interference layer is provided on the antiglare layer, the optical film obtained suffers deterioration in uniformity of thickness and cannot have low reflectance. Therefore, it is preferred that the particles good in dispersibility be chosen as the second light-transmitting particles.

In the special case where two layers, such as a high refractive index layer and a low refractive index layer, or three layers, such as a high refractive index layer, a medium refractive index layer and a low refractive index layer, are provided with the intention of reducing reflectance, there may occur a problem that the optical film formed cannot have low reflectance because of deterioration in uniformity of thickness. In the invention, therefore, organic polymer-containing particles with the core particle/shell layer structure as described hereinafter are used as the second light-transmitting particles for the purpose of preventing the proportion of flat portions at the film surface from being reduced by aggregation of the second light-transmitting particles. Moreover, it is preferred that the shell layer be formed with an ingredient having good dispersibility in a light-transmitting resin. In this case, it is particularly advantageous for the shell layer to be formed with at least one kind of polymer chosen from polymers of acrylic acid esters, polymers of methacrylic acid esters or copolymers of acrylic acid esters and methacrylic acid esters.

The second light-transmitting particles preferably have an average particle size smaller than an average thickness of the antiglare layer. More specifically, the average particle size of the second light-transmitting particles is preferably at least 0.1 μm smaller than the average thickness of the antiglare layer in order to impart internal scatter capability without causing unevenness of the surface. And for the purpose of resisting reduction in flat portions at the film surface, the average particle size is preferably at least 1 μm, more preferably at least 2 μm, further preferably at least 4 μm, smaller than the average thickness of the antiglare layer. When a low refractive index layer is provided on the antiglare layer on the surface of which asperities are formed of the particles for causing internal scatter, nonuniform thickness, uneven coating and repelling arise from the asperities unless the average particle size of the second light-transmitting particles is at least 0.1 μm smaller than the average thickness of the antiglare layer. In such a case, uniform thickness is not obtained, optimum interference of light as designed does not occur, and reduction in reflectance is not attained.

The particle sizes of the second light-transmitting particles are preferably from 3 μm to 10 μm, more preferably from 5 μm to 10 μm, particularly preferably from 6.5 μm to 8.5 μm, from the viewpoint of ensuring a suitable internal scatter capability. When the particle size is not smaller than 3 μm, distribution of light scattering angles is not extended to wide angles, whereby blurring of letters and lowering of contrast are not caused; while, when the particle size is not greater than 10 µm, scattering of light becomes sufficient.

The mixing proportion of the second light-transmitting particles is preferably from 2 mass % to 30 mass %, more preferably from 3 mass % to 25 mass %, particularly preferably from 5 mass % to 20 mass %, based on the total solids in the antiglare layer from the viewpoint of imparting internal scatter capability and improving glitter. When the second light-transmitting particles are added in such a proportion and the resulting film is used for the surface of a liquid crystal display (LCD), the internal scatter property becomes moderate, blurred images, a whitish feel of surface and a drop in display contrast are reduced, and glitter is improved.

From the viewpoint of controlling the haze value and dispersibility and ensuring uniformity in coating surface condition, the second light-transmitting particles are preferably monodisperse particles with respect to the particle size distribution. In other words, they are preferably particles of uniform size. The CV value indicating the uniformity in particle sizes is preferably from 0 to 10%, more preferably from 0 to 8%, further preferably from 0 to 5%. In addition, when particles having sizes at least 2 µm greater than the average size are defined as coarse particles, it is appropriate that such coarse particles constitute at most 0.01%, preferably at most 0.001%, more preferably at most 0.0001%, of all the particles by number. When the number of coarse particles is greater than 0.01% of the total number of particles, the coating surface tends to have a pimple feel arising from coarse particles. An example of a strong measure to prepare particles having such a size distribution is classification after preparation or synthesis reaction, and particles having the desired size distribution can be obtained by increasing the number of times the classification is carried out or the severity of the classification. For the classification, it is favorable to adopt a wind classification method, a centrifugal classification method, a precipitation classification method, a filtration classification method, an electrostatic classification method or the like. The average particle size of light-transmitting particles is determined by observing the light-transmitting particles under an optical microscope and taking the average of particles diameters of 100 particles observed. With respect to the size distribution, it is preferred that the first light-transmitting particles also fall within the foregoing range of the CV value.

<Organic Polymer-Containing Particles of Core Particle/Shell Layer Structure>

In the invention, the second light-transmitting particles dispersed as particles causing internal scatter in the antiglare layer have a core/shell structure, or a double structure having a core part (core particle) and a shell part (shell layer).

In the invention, it is preferred that the refractive index of the core particle ($n_1$) be greater than the refractive index of the shell layer ($n_2$). The difference between $n_1$ and $n_2$ ($n_1$-$n_2$) is preferably from 0.01 to 0.19, more preferably from 0.03 to 0.15, further preferably from 0.05 to 0.10.

In the invention, it is preferable that the refractive index of the core particle ($n_1$) is not only higher than that of the shell layer ($n_2$) but also in a range of 1.54 to 1.65. And it is more preferred that the range of $n_1$ extend from 1.55 to 1.60, especially from 1.56 to 1.60. When the core particle has a refractive index 1.54 or higher, its scattering capability and glitter-preventing capability become high; while, when the refractive index is 1.65 or lower, distribution of light scattering angles is not extended to wide angles, whereby blurring of letters and lowering of contrast are not caused.

Suitable examples of the core particle include resin particles, such as cross-linked methyl methacrylate-styrene copolymer particles, cross-linked polystyrene particles, cross-linked acrylate-styrene copolymer particles, melamine-formaldehyde resin particles and benzoguanamine-formaldehyde resin particles. Of these resin particles, cross-linked polystyrene particles, cross-linked methyl methacrylate-styrene copolymer particles and the like are preferred over the others.

The refractive index of the shell layer ($n_2$) is preferably from 1.46 to 1.53, more preferably from 1.47 to 1.51, further preferably from 1.49 to 1.50. It is advantageous for the shell layer to contain at least one polymer chosen from polymers of acrylic acid esters, polymers of methacrylic acid esters or copolymers of acrylic acid esters and methacrylic acid esters in terms of attainment of good dispersibility in an acrylate resin suitable as the light-transmitting resin used for a matrix of the antiglare layer and prevention of asperity formation by aggregation.

Suitable examples of a polymer usable in the shell layer include resins, such as cross-linked polymethyl methacrylate, cross-linked methyl methacrylate-styrene copolymer, cross-linked methyl methacrylate-methyl acrylate copolymer, and cross-linked acrylate-styrene copolymer. Of these resins, cross-linked polymethyl methacrylate, cross-linked methyl methacrylate-styrene copolymer and the like are preferable to the others. Although refractive index adjustment can be made by changing the polymerizing ratio between methyl methacrylate and styrene in cross-linked methyl methacrylate-styrene copolymer, cross-linked polymethyl methacrylate is most suitable in terms of attainment of good dispersibility in an acrylate resin suitable as the light-transmitting resin used for a matrix of the antiglare layer and prevention of asperity formation by aggregation.

The thickness range of the shell layer extends preferably from 10 nm to 2,000 nm, more preferably from 20 nm to 1,000 nm, further preferably from 50 nm to 300 nm. When the thickness is thinner than 10 nm, delamination of interfaces between the light-transmitting resin and light-transmitting particles occurs after durability testing, and gives rise to change in internal scatter capability. When the thickness is increased beyond 2,000 nm, refraction of light occurs between the core particle and the shell layer; as a result, light is scattered over a wide angle, and thereby display contrast becomes worse.

The second light-transmitting particles are added in an amount of 2 to 30 mass %, preferably 5 to 30 mass %, more preferably 10 to 25 mass %, based on the total solids in the antiglare layer. When the antiglare film containing the second light-transmitting particles in such an addition amount is used at the surface of a liquid crystal display (LCD), a moderate internal scatter property is delivered, and blurred images, a whitish feel of surface and a drop in display contrast are reduced and glitter is improved.

The average particle size of the light-transmitting particles refers to the primary particle size irrespective of whether every two or more of the particles are present in a coating in a state of being adjacent to one another or in a state of being independent of one another. However, when the secondary particles of cohesive inorganic particles having a primary particle size on the order of 0.1 µm are dispersed into a coating solution in sizes satisfying the particle size requirement of the invention and then coated, the average size of these secondary particles is adopted as the average particle size. The particles used may be either perfectly spherical or indefinite in shape, but the shape of a perfect sphere is especially preferable.

The particle size distribution of these particles can be measured in accordance with the Coulter counter method, and the distribution measured is converted into the particle count distribution. The average particle size is calculated from the distribution obtained, or determined by light-scattering methods or electron micrographs.

Since the light-transmitting particles are apt to precipitate out of a coating solution, an inorganic filler such as silica may be added for the purpose of preventing precipitation. The greater the amount of inorganic filler added, the greater a detrimental effect of the inorganic filler on transparency of the coating formed though the more effective the addition of inorganic filler becomes in preventing precipitation of the light-transmitting particles. Therefore, it is appropriate that an inorganic filler having a particle size of 0.5 μm or below, especially 0.1 μm or below, be added in such an amount as not to impair the transparency of coating, specifically smaller than about 0.1 mass % based on the binder.

In the present antiglare film, the surface haze value (the value of haze arising from surface scatter) is preferably from 0 to 2%, more preferably from 0.1% to 1%, further preferably from 0.1% to 0.5%.

As to the present antiglare film, the arithmetic average roughness (Ra) of its surface having asperities lies within a range of 0.03 μm<Ra<0.4 μm, the average interval (Sm) of the asperities lies within a range of 80 μm<Sm<700 μm and, when slope angles θ of the asperities are measured, a region (θ(0.5)) of 0°<θ<0.5° constitutes at least 40%, preferably 40% to 90%, of the antiglare film surface.

The integrated reflectance of the antiglare film is preferably 1.5% or below, more preferably 1.0% or below.

From the viewpoint of imparting antiglare capability, the Ra range is preferably 0.05 μm<Ra<0.20 μm, more preferably 0.08 μm<Ra<0.15 μm. For further achieving the compatibility between satisfactory antiglare capability and uniform stacking of thin-film interference layer(s) by increasing flat portions on the film surface, the range of average interval between asperities (Sm) is preferably 150 μm<Sm<700 μm, especially 200 μm<Sm<600 μm. The region (θ(0.5)) in which slope angles θ of the asperities are within the range of 0°<θ<0.5° is further preferably from 45% to 90%, particularly preferably from 50% to 90%. The integrated reflectance of the antiglare film is further preferably from 0.01% to 1.0%.

When the arithmetic average roughness (Ra) of the antiglare film is greater than 0.03 μm, the asperities are present in an appropriate amount on the film surface, and a sufficient antiglare capability can be obtained. The Ra values smaller than 0.4 μm are preferred because there don't arise problems that a display screen becomes whitish by glitter and reflections of extraneous light and a drop in interference capability develops because of thickness unevenness according to asperities.

When the average interval of asperities (Sm) is greater than 80 μm, the antiglare film does not take an uneven surface structure which is scarce of flat portions, so it is free of a problem that a drop in interference capability is caused by nonuniform thickness. On the other hand, the Sm values smaller than 700 μm are preferred because the antiglare film can have sufficient antiglare property without taking a surface structure very rich in flat portions.

It is preferred that the region θ(0.5) be 40% or above, because a drop in interference capability by thickness unevenness according to asperities does not develop and antireflective film satisfactory in denseness of black can be obtained even when the integrated reflectance is 1.5% or above. For achieving a better antiglare property, it is also preferred that the region θ(0.5) be 90% or below.

In the present antiglare film, the internal haze value (value of haze arising from internal scatter) is preferably from 5% to 90%, more preferably from 10% to 40%, especially preferably from 10% to 20%.

<Preparation of Light-Transmitting Particles>

Examples of a method for producing light-transmitting particles relating to the invention include a suspension polymerization method, an emulsion polymerization method, a soap-free emulsion polymerization method, a dispersion polymerization method and a seed polymerization method, and any of these methods may be adopted in the invention. For these polymerization methods, the methods described in Takayuki Ohtsu & Masayoshi Kinoshita, Kobunshi Gosei no Jikken-ho, pp. 130, 146 and 147, Kagaku-dojin Publishing Co., Inc., the methods described in Gosei Kobunshi, vol. 1, pp. 246-290, and vol. 3, pp. 1-108, and the methods disclosed in Japanese Patent Nos. 2543503, 3508304, 2746275, 3521560 and 3580320, JP-A-10-1561, JP-A-7-2908, JP-A-5-297506, JP-A-2002-145919 and so on can be referred to. When a shell layer is provided in forming the core particle shell layer structure according to the invention, minute particles made up of the shell layer component alone are formed. Therefore, it is necessary to carry out classification.

<Binder for Forming Matrix of Antiglare Layer>

The binder for forming a matrix of the antiglare layer, though not limited to particular ones, is preferably a light-transmitting polymer which has as its main chain a saturated hydrocarbon chain or a polyether chain after curing with ionizing radiation or the like. In addition, it is preferable that the main binder polymer having undergone curing has a cross-linked structure.

For attaining the required internal scatter capability, it is requisite to control the reflectance difference between each of core particles in the second light-transmitting particles and the light-transmitting resin (matrix). The absolute value of the reflectance difference between each core particle and the light-transmitting resin is preferably from 0.01 to 0.060, more preferably from 0.015 to 0.050, especially preferably from 0.020 to 0.040.

As the binder polymer which has as its main chain a saturated hydrocarbon chain after curing, a polymer prepared from an ethylenic unsaturated monomer chosen from the compounds belonging to the first group described below and copolymers thereof is suitable. On the other hand, as the binder polymer which has a polyether chain as its main chain, a polymer prepared from an epoxy monomer chosen from the compounds belonging to the second group described below and polymers prepared by ring-opening reaction thereof is suitable. Further, a polymer prepared from a mixture of those monomers is also suitable.

As the binder polymer which has not only a saturated hydrocarbon chain as its main chain but also a cross-linked structure and is prepared from a compound of the first group a (co)polymer prepared from a monomer having two or more ethylenic unsaturated groups is suitable. For attaining a high refractive index, it is appropriate that such a monomer contain in its structure at least one element chosen from aromatic rings, halogen atoms other than fluorine, a sulfur atom, a phosphor atom or a nitrogen atom.

Examples of a monomer having two or more ethylenic unsaturated groups, which is used in preparation of a binder polymer for forming the antiglare layer, include esters of polyhydric alcohols and (meth)acrylic acid (such as ethylene glycol di(meth)acrylate, 1,4-cyclohexanediacrylate, pentaerythritol tetra(meth)acrylate, pentaerythritol tri(meth) acrylate, trimethylolpropane tri(meth)acrylate, trimethylolethane tri(meth)acrylate, dipentaerythritol tetra(meth)

acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate), vinylbenzene and derivatives thereof (such as 1,4-divinylbenzene, 4-vinylbenzoic acid-2-acryloyl ethyl ester and 1,4-divinylcyclohexanone), vinyl sulfones (such as divinyl sulfone), and (meth)acrylamides (such as methylenebisacrylamide).

And additional examples can include resins each having two or more ethylenic unsaturated groups, such as relatively low-molecular polyester resin, polyether resin, acrylic resin, epoxy resin, urethane resin, alkyd resin, spiro-acetal resin, polybutadiene resin and polythiolpolyene resin, and oligomers or prepolymers of multifunctional compounds such as polyhydric alcohols. The monomers as recited above may be used as combinations of two or more thereof, and it is preferable that resins each having two or more ethylenic unsaturated groups are contained in a proportion of 10% to 100% to the total amount of binder.

Polymerization of those monomers having ethylenic unsaturated groups can be performed in the presence of a radical photopolymerization initiator or a radical thermopolymerization initiator under irradiation with ionizing radiation or heating. Accordingly, the antiglare layer is formed by preparing a coating solution containing a monomer having ethylenic unsaturated groups, a radical photopolymerization initiator or a radical thermopolymerization initiator and particles, and further, if needed, an inorganic filler, a coating aid, other additives, an organic solvent and so on, coating the coating solution on a transparent support, and then curing the coating through polymerization reaction with the aid of ionizing radiation or heat. Herein, it is also appropriate that ionizing radiation cure and thermosetting be carried out in combination. As the photopolymerization initiator and the thermopolymerization initiator, commercially available compounds can be used, and they are described in Saishin UV Koka Gijutsu (p. 159, publisher: Kazuhiro Takahaku, publishing office: K. K. Gijutu Joho Kyokai, issued in 1991) and catalogs of Ciba Specialty Chemicals Inc.

For the purpose of reducing curing shrinkage of cured film, it is appropriate in the invention that the epoxy compounds as described below be used as compounds of the second group. As the monomers having epoxy groups, monomers having two or more epoxy groups per molecule are suitable, and examples thereof include the epoxy monomers disclosed e.g. in JP-A-2004-264563, JP-A-2004-264564, JP-A-2005-37737, JP-A-2005-37738, JP-A-2005-140862, JP-A-2005-140862, JP-A-2005-140863 and JP-A-2002-322430.

In point of reduction in curing shrinkage, it is preferred that the monomers having epoxy groups be contained in a proportion of 20 to 100 mass %, preferably 35 to 100 mass %, more preferably 50 to 100 mass %, with respect to the total binders constituting the antiglare layer.

Examples of a photo-acid generator which generates a cation by action of light and allows polymerization of the second-group compounds, namely epoxy monomers, include ionic compounds such as triarylsulfonium salts and diaryliodonium salts, and nonionic compounds such as nitrobenzyl ester of sulfonic acid. As these compounds, various hitherto-known photo-acid generators including the compounds described e.g. in Imaging yo Yuki Zairyo, edited by The Japanese Research Association for Organic Electronics Materials and published by BUNSHIN DESIGN PRINTING PUBLISHING AND DIGITAL COMMUNICATIONS (1997), can be used. Of these compounds, sulfonium salts and iodonium salts in particular are used to advantage, and suitable examples of counter ions thereof include $PF_6^-$, $SbF_6^-$, $AsF_6^-$ and $B(C_6F_5)_4^-$.

When the antiglare layer has a thickness of 3 μm to 40 μm, it is appropriate for prevention of curl by curing shrinkage that the antiglare layer be a layer formed from a polymer or a copolymer, which is formed from at least either the following (A1) or the following (A2), or from a mixture of such polymer and copolymer.

(A1): Alkyl acrylate having at least either a hydroxyl group or an acryloyl group in its alkyl moiety (A2): Alkyl methacrylate having at least either a hydroxyl group or an acryloyl group in its alkyl moiety When those ingredients for forming the antiglare layer are used, occurrence of curl can be controlled to, say, within 30 nm. The degree of curl occurrence is preferably within 20 nm, more preferably within 10 nm.

Each of the alkyl moieties contained in the acrylate (A1) and the methacrylate (A2), respectively, is an alkyl group having, say, 1 to 10 carbon atoms, which may have a straight-chain or a branched form. Examples of a polymer or a copolymer prepared from either the acrylate (A1) the methacrylate (A2), or the both include polymers and copolymers which each contain repeating units represented by the following formula (1), and mixtures of such polymers and copolymers.

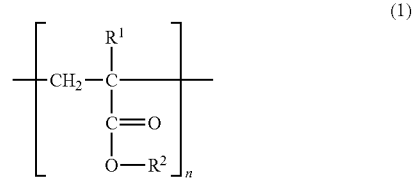

(1)

In the formula (1), $R^1$ is —H or —$CH_3$, $R^2$ is a group represented by —$CH_2CH_2OX$ or a group represented by the following formula (2), X is —H or an acryloyl group represented by the following formula (3).

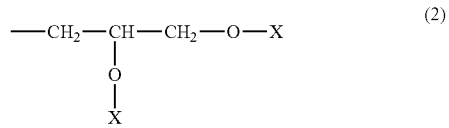

(2)

In the formula (2), X is —H or an acryloyl group represented by the following formula (3), and two Xs may be the same or different.

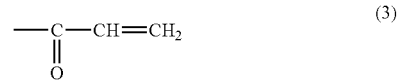

(3)

More specifically, the polymer or copolymer prepared using at least one kind of monomer selected from the group consisting of 2,3-dihydroxypropyl acrylate, 2,3-diacryloyloxypropyl acrylate, 2-hydroxy-3-acryloyloxypropyl acrylate, 2-acryloyloxy-3-hydroxypropyl acrylate, 2,3-dihydroxypropyl methacrylate, 2,3-diacryloyloxypropyl methacrylate, 2-hydroxy-3-acryloyloxypropyl methacrylate, 2-acryloyloxy-3-hydroxypropyl methacrylate, 2-hydroxyethyl acrylate, 2-acryloyloxyethyl acrylate, 2-hydroxyethyl methacrylate and 2-acryloyloxymethacrylate, or a mixture of such polymer and copolymer can be used for forming the antiglare layer.

When a layer-forming material containing the polymer or copolymer formed from at least either the acrylate (A1) or the methacrylate (A2), or a mixture of such polymer and copolymer is used, it is preferable that the layer-forming material is mixed with at least either urethane acrylate or urethane methacrylate, and at least either polyol acrylate or polyol methacrylate.

The total amount of polymerization initiators used is preferably from 0.1 to 15 mass %, more preferably from 1 to 10 mass %, with respect to 100 parts by mass of the first-group compound or the second-group compound.

<Macromolecular Compound in Antiglare Layer>

The present antiglare layer may contain another macromolecular compound. Addition of a macromolecular compound thereto allows reduction in curing shrinkage and viscosity adjustment to a coating solution to be used for the layer.

At the time of its addition to the coating solution, a macromolecular compound already has a polymerized form. Suitable examples of such a macromolecular compound include resins, such as cellulose esters (e.g. cellulose triacetate, cellulose diacetate, cellulose propionate, cellulose acetate propionate, cellulose acetate butyrate, cellulose nitrate), urethane acrylate resins, polyester acrylate resins, (meth)acrylate resins (e.g. methyl methacrylate-methyl acrylate copolymer, methyl methacrylate-ethyl (meth)acrylate copolymer, methyl methacrylate-butyl (meth)acrylate copolymer, methyl methacrylate-styrene copolymer, methyl methacrylate-(meth)acrylic acid copolymer, polymethyl methacrylate), and polystyrene.

In view of effects on curing shrinkage and viscosity increase in coating solution, such a macromolecular compound is preferably added in an amount of 1 to 50 mass %, especially 5 to 40 mass %, based on the total binders contained in the layer to which it is added. The suitable molecular weight of the macromolecular compound added is on the number average preferably from $0.3 \times 10^4$ to $4.0 \times 10^5$, more preferably from $0.5 \times 10^4$ to $3.0 \times 10^5$, further preferably from $0.5 \times 10^4$ to $2.0 \times 10^5$.

<Inorganic Filler in Antiglare Layer>

In addition to the light-transmitting particles, inorganic fillers can also be used in the present antiglare layer according to the purposes of making adjustments to refractive index and film strength, reducing curing shrinkage and lowering the reflectance in the case where a low refractive index layer is further provided on the antiglare layer. The inorganic filler used for such purposes is preferably an inorganic fine filler which has a high refractive index, includes an oxide containing at least one kind of metal element chosen e.g. from titanium, zirconium, aluminum, indium, zinc, tin or antimony and measures generally 0.2 μm or below, preferably 0.1 μm or below, more preferably 0.06 μm or below and 1 nm or more, in average size of primary particle.

When the refractive index of matrix is required to be lowered for adjusting a refractive index difference between each of the light-transmitting particles and the matrix, an inorganic fine filler having a low refractive index, such as particulate silica or hollow particulate silica, can be used in the matrix. The suitable particle size range of such an inorganic fine filler having a low refractive index is the same as that of the inorganic fine filler having a high refractive index.

Inorganic fillers are preferably subjected to surface treatment with a silane coupling agent or a titanate coupling agent. In other words, it is preferred that the filler particle surface be treated with a surface treating agent having a functional group capable of reacting with binder species.

The amount of inorganic fillers added is preferably from 10 to 90 mass %, more preferably from 20 to 80 mass %, particularly preferably from 30 to 75 mass %, of the total mass of the antiglare layer.

Additionally, inorganic fine fillers cause no scattering because they have particle sizes sufficiently shorter than wavelengths of light, and a dispersion formed by dispersing such fillers into a binder polymer has properties of an optically uniform material.

<Surfactant in Antiglare Layer>

In order to secure for the present antiglare layer uniformity of surface conditions, notably immunity from unevenness in coating or drying and point defects, it is preferred that at least either a fluorine-containing surfactant or a silicon-containing surfactant, or both be mixed into a coating composition for the antiglare layer. Among them, a fluorine-containing surfactant in particular is used to advantageous because its addition in a smaller amount can produce effects of improving drawbacks of surface conditions, such as unevenness in coating or drying and point defects. The purpose of addition of such a surfactant consists in productivity improvement by imparting high-speed coating suitability to the coating composition while enhancing uniformity of surface conditions. Suitable examples of a fluorine-containing surfactant include the compounds disclosed e.g. in JP-A-2007-188070, paragraph Nos. 0049 to 0074.

Surfactants (notably a fluorocarbon polymer) for use in the present antiglare layer are added in an amount of preferably 0.001 to 5 mass %, more preferably 0.005 to 3 mass %, further preferably from 0.01 to 1 mass %, based on the coating solution. When surfactants are added in a concentration of 0.001 mass % or above, they can sufficiently achieve their effect. On the other hand, their addition in a concentration of 5 mass % or below allows sufficient drying of the coating layer and achievement of satisfactory properties as the coating layer (e.g. reflectance, scratching resistance).

<Organic Solvent in Coating Solution for Antiglare Layer>

Organic solvents can be added to a coating composition for forming the antiglare layer.

Examples of an organic solvent which can be added include alcohol compounds, such as methanol, ethanol, n-propanol, isopropanol, n-butanol, isobutanol, sec-butanol, tert-butanol, isoamyl alcohol, 1-pentanol, n-hexanol and methylamyl alcohol; ketones, such as methyl isobutyl ketone, methyl ethyl ketone, diethyl ketone, acetone, cyclohexanone and diacetone alcohol; esters, such as methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl lactate and ethyl lactate; ethers and acetals, such as 1,4-dioxane, tetrahydrofuran, 2-methylfuran, tetrahydropyran and diethylacetal; hydrocarbons, such as hexane, heptanes, octane, isooctane, ligroin, cyclohexane, methylcyclohexane, toluene, xylene, ethylbenzene, styrene and divinylbenzene; halogenated hydrocarbons, such as carbon tetrachloride, chloroform, methylene chloride, ethylene chloride, 1,1,1-trichloroethane, 1,1,2-trichloroethane, trichloroethylene, tetrachloroethylene and 1,1,1,2-tetrachloroethane; polyhydric alcohols and derivatives thereof, such as ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-dipentanediol, glycerin monoacetate, glycerin ethers and 1,2,6-hexanetriol; fatty acids, such as formic acid, acetic acid, propionic acid, butyric acid, isobutyric acid, isovaleric acid and lactic acid; nitrogen-containing compounds, such as formamide, N,N-dimethylformamide, acetamide and acetonitrile; and sulfur-containing compounds, such as dimethyl sulfoxide.

Of these organic solvents, methyl isobutyl ketone, methyl ethyl ketone, cyclohexanone, acetone, toluene, xylene, ethyl acetate, 1-pentanol and the like are especially preferable to the others. These organic solvents may be mixed with alcoholic solvents or polyhydric alcohols as appropriate for the purpose of controlling aggregation. Those solvents may be used alone or as mixtures of two or more thereof. The total content of organic solvents in a coating composition is preferably from 20 to 90 mass %, more preferably from 30 to 80 mass %, especially preferably from 40 to 70 mass %. For the purpose of stabilizing the surface conditions of the antiglare layer, the combined use of a solvent having a boiling temperature lower than 100° C. and a solvent having a boiling temperature higher than 100° C. is suitable.

<Curing of Antiglare Layer>

After the coating solution is coated on a support, the antiglare layer can be formed by subjecting the solution coated to cross-linking or polymerization reaction under light exposure, electron beam irradiation, heating treatment or so on. For ultraviolet irradiation, ultraviolet light emitted from a light source, such as an ultrahigh-pressure mercury lamp, a high-pressure mercury lamp, a low-pressure mercury lamp, a carbon-arc lamp, a xenon-arc lamp or a metal-halide lamp, can be employed. The curing with ultraviolet light is preferably performed under an atmosphere having an oxygen concentration reduced to 4 vol % or below, preferably 2 vol % or below, especially preferably 0.5 vol % or below by a nitrogen-used purge.

Layers other than the antiglare layer are described below.

<Low Refractive Index Layer>

It is advantageous for the present antiglare film to be provided with a low refractive index layer in order to attain a reduced reflectance. The refractive index of the low refractive index layer is preferably from 1.20 to 1.46, more preferably from 1.25 to 1.46, particularly preferably from 1.30 to 1.40. The thickness of the low refractive index layer is preferably from 50 to 200 nm, more preferably from 70 to 100 nm. The haze of the low refractive index layer is preferably 3% or below, more preferably 2% or below, further preferably 1% or below.

Examples of a suitable aspect of the curing composition include:

(1) a composition that contains a fluorine-containing polymer having cross-linkable or polymerizable functional groups, (2) a composition that mainly contains hydrolytic condensates of a fluorine-containing organosilane material, and (3) a composition that contains a monomer having two or more ethylenic unsaturated groups and inorganic fine particles of hollow structure.

(1) Fluorine-Containing Compound with Cross-Linkable or Polymerizable Functional Groups:

Examples of a fluorine-containing compound having cross-linkable or polymerizable functional groups include copolymers of fluorine-containing monomers and monomers having cross-linkable or polymerizable functional groups. These fluorine-containing polymers are disclosed e.g. in JP-A-2003-222702 and JP-A-2003-183322.

Those polymers and a curing agent having a polymerizable unsaturated group may be used in combination when required, as disclosed in JP-A-2000-17028. Alternatively, as disclosed in JP-A-2002-145952, it is also appropriate to use those polymers in combination with fluorine-containing multifunctional compounds having polymerizable unsaturated groups. Examples of a multifunctional compound having polymerizable unsaturated groups include monomers having two or more ethylenic unsaturated groups per molecule. In addition, the hydrolytic condensates of organosilanes disclosed in JP-A-2004-170901, especially the hydrolytic condensates of a (meth)acryloyl group-containing organosilane, are also suitable. These compounds are preferable because they can produce greater combined-use effect on improvement in scratch resistance, especially when used in combination with compounds having polymerizable unsaturated groups in their respective polymer bodies.

When polymers don't have sufficient curability by themselves, the required curability can be imparted thereto by mixing with cross-linkable compounds. For instance, when a polymer has hydroxyl groups in its body, various amino compounds are preferably used as curing agents. Amino compounds usable as cross-linkable compounds are e.g. compounds having in each individual molecule at least two hydroxyalkylamino groups, at least two alkoxyalkylamino groups, or a total of at least two groups including both hydroxyalkylamino and alkoxyalkylamino groups. Examples of such an amino compound include melamine compounds, urea compounds, benzoguanamine compounds and glycoluril compounds. For curing of these compounds, organic acids or salts thereof are preferably used.

(2) Hydrolytic Condensates of Fluorine-Containing Organosilane Material:

A composition that mainly contains hydrolytic condensates of a fluorine-containing organosilane compound is also preferable because it has a low refractive index and forms a coating with high surface hardness. The suitable condensates are condensates prepared from a tetraalkoxysilane and a compound containing at least one fluorinated alkyl group and hydrolysable silanol sited at one end or both ends of its fluorinated alkyl group. Examples of such a composition include those disclosed in JP-A-2002-265866 and JP-A-2002-317152.

(3) Composition Containing Monomer Having Two or More Ethylenic Unsaturated Groups and Inorganic Fine Particles of Hollow Structure:

Still another suitable aspect is a low refractive index layer that contains particles having a low refractive index and a binder. The particles having a low refractive index, though may be either organic or inorganic ones, are preferably particles having holes on the inside. Examples of hollow particles include the silica particles disclosed in JP-A-2002-79616. The refractive index of the particles is preferably from 1.15 to 1.40, more preferably from 1.20 to 1.30. Examples of a binder usable herein include the monomers having at least two ethylenic unsaturated groups per molecule as recited in the foregoing description of the antiglare layer.

To the low refractive index layer for use in the invention, the polymerization initiators as recited in the foregoing description of the antiglare layer are preferably added. In the case of containing a radical polymerizable compound, such a polymerization initiator can be used in an amount of 1 to 10 mass %, preferably 1 to 5 mass %, based on the radical polymerizable compound.

The low refractive index layer for use in the invention can also incorporate inorganic particles. For impartment of scratch resistance, fine particles of sizes falling in a range of 15% to 150%, preferably 30% to 100%, more preferably 45% to 60%, of the thickness of the low refractive index layer can be used.

To the low refractive index layer for use in the invention, hitherto known polysiloxane or fluorine-containing soil-resisting and slipping agents can be added as appropriate for the purpose of imparting properties of resisting soil, water and chemicals, a slipping property, and so on.

In the invention, the suitable integrated reflectance of an antireflective film provided with the low refractive index layer and so on is preferably 3.0% or below, more preferably 2.0% or below, especially preferably 1.5% or below and 0.3% or more. By lowering the integrated reflectance, sufficient antiglare capability can be achieved even when scatter of light from the antiglare film surface is reduced, so antireflective film ensuring deep pure blacks can be obtained.

<High Refractive Index Layer and Medium Refractive Index Layer>

It is preferable that the present antireflective film has a high refractive index layer; more preferably further has a medium reflective index layer, for the purpose of enhancing its antireflection capability.

Hereinafter, the high refractive index layer and the medium refractive index layer are sometimes collectively called a high refractive index layer. Additionally, the adjectives "high", "medium" and "low" in the expressions of "high refractive index layer", "medium refractive index layer" and "low refractive index layer", respectively, describe a relative magnitude relation among refractive indexes of layers. As for the refractive-index relation with the antiglare film, it is preferable that the relational expressions, antiglare film>low refractive index layer and high refractive index layer>antiglare film, are satisfied.

In the invention, the medium refractive index layer is a layer higher in refractive index than the antiglare layer and lower in refractive index than a high refractive index layer, and preferably provided between the antiglare layer and the high refractive index layer.

Further, the high refractive index layer, the medium refractive index layer and the low refractive index layer are sometimes collectively called an antireflective layer.

When the antireflective film is structured so that a high refractive index layer and a low refractive index layer are provided on the antiglare layer, the refractive index of the high refractive index layer is preferably from 1.55 to 2.30, more preferably from 1.55 to 2.00, even more preferably from 1.55 to 1.70.

When the antireflective film is formed by providing on the support a medium refractive index layer, a high refractive index layer and a low refractive index layer in order of increasing distance from the support, the refractive index of the high refractive index layer is preferably from 1.60 to 2.30, more preferably from 1.65 to 2.20. And the refractive index of the medium refractive index layer is adjusted to take a value intermediate between the refractive index of the low refractive index layer and that of the high refractive index layer. The refractive index of the medium refractive index layer is preferably from 1.55 to 1.80, more preferably from 1.60 to 1.70.

Each of the high refractive index layer and the medium refractive index layer for use in the invention can preferably contain inorganic particles for the purposes of making an adjustment to its refractive index and improving its ability to be coated on the antiglare layer. In forming each of the high refractive index layer and the medium refractive index layer, it is preferable that the dispersion liquid prepared by dispersing inorganic particles into a dispersion medium is further admixed preferably with binder precursors (e.g. the ionizing radiation-curable multifunctional monomers or oligomers as recited hereinafter) required for matrix formation, an initiator for photopolymerization and so on, thereby preparing a coating composition for formation of each of high and medium refractive index layers, and the coating compositions thus prepared are coated on a transparent support and cured by crosslinking reaction or polymerization reaction of the ionizing radiation-curable compounds (such as multifunctional monomers and oligomers).

As the binder precursors usable in the high refractive index layer and the medium refractive index layer, the compounds as recited above (those having polymerizable unsaturated bonds) are suitable. These compounds may be used as combinations of two or more thereof.

To each of the high refractive index layer and the medium refractive index layer, the binder precursors are preferably added in a proportion of 5 to 80 mass % based on the total solid content in the coating composition for each layer.

The content of inorganic fine particles in each of the high refractive index layer and the low refractive index layer preferably constitutes 30 to 90 mass %, more preferably 40 to 80 mass %, particularly preferably 50 to 75 mass %, of the total solid content in each layer. A combination of two or more kinds of inorganic fine particles may be used in each layer.

In the high refractive index layer and the medium refractive index layer, binder precursors prepared by crosslinking or polymerization reaction of ionizing radiation-curable compounds containing aromatic rings, ionizing radiation-curable compounds containing halogen atoms other than fluorine atoms (e.g. Br, I, Cl), ionizing radiation-curable compounds containing S, N or/and P atoms, or the like can also be used to advantage.

(Inorganic Fine Particles)

For the purposes of making adjustments to refractive indexes, improving thickness uniformity and repelling in a coating formed on the antiglare layer, and enhancing physical properties, such as hardness, and optical properties, such as reflectance and scattering capability, various kinds of inorganic fine particles can be used in the invention. The amount of inorganic fine particles added to each of the high refractive index layer and the medium refractive index layer is preferably at least 30 mass %, more preferably at least 40 mass %, especially preferably at least 50 mass %, of the total solid content in each layer. The addition of particles in an amount smaller than 30 mass % is undesirable because repelling occurs on the antiglare layer and the resultant coating degrade uniformity of its thickness.

The inorganic fine particles are fine particles of oxide of at least one kind of metal chosen from silicon, zirconium, titanium, aluminum, indium, zinc, tin or antimony, with examples including $SiO_2$, $ZrO_2$, $TiO_2$, $Al_2O_3$, $In_2O_3$, $ZnO$, $SnO_2$, $Sb_2O_3$, ITO and ATO. In other words, it is preferable in the invention that the high refractive index layer and the medium refractive index layer contain fine particles of oxide of at least one metal chosen from Si, Al, Ti, Zr, Sb, Zn, Sn or In. In addition to these fine particles, other inorganic fine particles, such as $BaSO_4$, $CaCO_3$, talc or kaolin, can also be used.

When the high refractive index layer and the medium refractive index layer are formed, it is preferred that the coating composition prepared by dispersing inorganic fine particles having a high refractive index in combination with the binder precursors, and further an initiator and an organically-substituted silicon compound into a solvent be converted into a cured matter.

As the inorganic fine particles dispersed into the coating composition, $ZrO_2$ and $TiO_2$ are especially suitable in point of refractive index.

As the $TiO_2$ particles, inorganic particles whose major constituent is $TiO_2$ containing at least one element chosen from cobalt, aluminum or zirconium are especially suitable. The term "major constituent" used herein refers to the constituent having the highest content (mass %) of all the constituents of the particles.

It is appropriate in the invention that the particles containing $TiO_2$ as the major constituent have their refractive index in a range of 1.90 to 2.80, preferably 2.10 to 2.80, especially preferably 2.20 to 2.80.

The suitable crystal structure of particles containing $TiO_2$ as the major constituent is a structure having as its main component a rutile structure, a mixed rutile-anatase structure, an anatase structure or an amorphous structure, and it is especially preferred that the main component of the particle structure be a rutile structure. The term "main component" as used herein refers to the component having the highest content (mass %) of all the structural components of the particles.

By incorporating at least one element chosen from Co (cobalt), Al (aluminum) or Zr (zirconium) into particles whose major constituent is $TiO_2$, the photocatalytic activity of $TiO_2$ can be suppressed, and weather resistance of the present film can be improved.

Of those elements, Co (cobalt) is especially preferable to the others. And a combined use of two or more of those elements is also preferred.

The inorganic particles containing $TiO_2$ as the major constituent may have a core/shell structure by undergoing surface treatment as disclosed in JP-A-2001-166104.

It is preferable that the size of the inorganic fine particles used in the invention is minimized in a dispersion medium, and the suitable mass-average particle size is from 1 to 200 nm, preferably from 5 to 150 nm, more preferably 10 to 100 nm, particularly preferably from 10 to 80 nm. By fining the inorganic particles so as to have sizes not larger than 200 nm, film can be formed without loss of transparency. The sizes of inorganic fine particles can be determined by use of light-scattering methods or electron micrographs.

The specific surface area of the inorganic fine particles is preferably from 10 to 400 $m^2/g$, more preferably from 20 to 200 $m^2/g$, especially preferably from 30 to 150 $m^2/g$.

The inorganic fine particles for use in the invention are preferably dispersed into a dispersion medium and added to a coating solution for forming each constituent layer.

As a dispersion medium for inorganic fine particles, liquid having its boiling point in a range of 60° C. to 170° C. is preferably used. Examples of such a dispersion medium include water, alcohol (e.g. methanol, ethanol, isopropanol, butanol, benzyl alcohol), ketone (e.g. acetone, methyl ethyl ketone, methyl isobutyl ketone, cyclohexanone), ester (e.g. methyl acetate, ethyl acetate, propyl acetate, butyl acetate, methyl formate, ethyl formate, propyl formate, butyl formate), aliphatic hydrocarbon (e.g. hexane, cyclohexane), halogenated hydrocarbon (e.g. methylene chloride, chloroform, carbon tetrachloride), aromatic hydrocarbon (e.g. benzene, toluene, xylene), amide (e.g. dimethylformamide, dimethylacetamide, n-methylpyrrolidone), ether (e.g. diethyl ether, dioxane, tetrahydrofuran), and etheralcohol (e.g. 1-methoxy-2-propanol). Of these dispersion media, toluene, xylene, methyl ethyl ketone, methyl isobutyl ketone, cyclohexanone and butanol are preferable to the others.

Among them, especially preferred dispersion media are methyl ethyl ketone, methyl isobutyl ketone and cyclohexanone.

The inorganic fine particles are dispersed by means of a dispersing machine. Examples of the dispersing machine include a sand grinder mill (e.g. a pin-attached bead mill), a high speed impeller mill, a pebble mill, an attrition mill and a colloid mill. Of these dispersing machines, a sand grinder mill and a high speed impeller mill are preferred over the others. In addition, a preliminary dispersion treatment may be carried out. Examples of a dispersing machine used in the preliminary dispersion treatment include a ball mill, a three-rod roll mill, a kneader and an extruder.

(Conductive Particles)

In order to impart conductivity to the present antireflective film, various kinds of conductive particles can be used.

The conductive particles are preferably formed from a metal oxide or nitride. Examples of a metal oxide or nitride include tin oxide, indium oxide, zinc oxide and titanium nitride. Among them, tin oxide and indium oxide are preferred over the others. The conductive inorganic particles contain such a metal oxide or nitride as their major constituent, and can further contain other elements. The term "major constituent" as used herein refers to the constituent having the highest content (mass %) of all the constituents of the particles. Examples of other elements include Ti, Zr, Sn, Sb, Cu, Fe, Mn, Pb, Cd, As, Cr, Hg, Zn, Al, Mg, Si, P, S, B, Nb, In, V and halogen atoms. For the purpose of enhancing conductivity of tin oxide and indium oxide, addition of Sb, Sn, P, B, Nb, In, V or a halogen atom is favorable. In particular, Sb-containing tin oxide (ATO) and Sn-containing indium oxide (ITO) are preferred. The suitable proportion of Sb in ATO is from 3 to 20 mass %, and that of Sn in ITO is from 5 to 20 mass %.

The conductive inorganic particles may be subjected to surface treatment. The surface treatment is performed using an inorganic compound or an organic compound. The inorganic compound used suitably for the surface treatment is alumina or silica, and silica treatment in particular is favorable. Examples of an organic compound used for the surface treatment include polyol, alkanolamine, stearic acid, a silane coupling agent and a titanate coupling agent. Of these compounds, a silane coupling agent is especially preferred. Two or more types of surface treatment may be carried out in combination.

The conductive inorganic particles are preferably in the shape of a rice grain, a sphere, a cube or a spindle, or indefinite in shape. Additionally, a combination of two or more kinds of conductive particles may be used in a specific layer or in film form.

In forming an antistatic layer, the conductive inorganic particles can be used in a state of being dispersed.

The thickness of the high refractive index layer and that of the medium refractive index layer can be designed appropriately according to their uses. When the high refractive index layer and the medium refractive index are used as optical interference layers, the thickness thereof is preferably from 30 to 200 nm, more preferably from 50 to 170 nm, particularly preferably from 60 to 150 nm.

As to the haze of the high refractive index layer and the medium refractive index layer, the lower the better in the case where particles for imparting antiglare capability thereto are absent. The haze value is preferably 5% or below, more preferably 3% or below, particularly preferably 1% or below.

The high refractive index layer and the medium refractive index layer are preferably formed on the antiglare layer directly or via another layer.

In order to ensure uniform surface conditions free of unevenness in coating and drying, point defects and so on in the high refractive index layer and the medium refractive index layer for use in the invention, it is appropriate that either a fluorine-containing surfactant or a silicone surfactant, or both be incorporated in a coating composition for forming the antiglare layer. As these surfactants, the surfactants recited in the foregoing description of the antiglare layer can be used.

<Transparent Support>

As a transparent support of the present antiglare film, plastic film is suitable for use. Examples of a polymer forming the plastic film include cellulose acylates (such as triacetyl cellulose and diacetyl cellulose, notably TAC-TD80U and TD80UF produced by FUJIFILM Corporation), polyamide, polycarbonate, polyesters (such as polyethylene terephthalate and polyethylene naphthalate), polystyrene, polyolefin, norbornene resin (ARTON, trade name, a product of JSR Corporation), non-crystalline polyolefin (ZEONEX, trade name, a product of ZEON CORPORATION), and (meth) acrylic resins (ACRYPET VRL20A, trade name, a product of MITSUBISHI RYAON CO., LTD., and the ring structure-containing acrylic resins disclosed in JP-A-2004-70296 and JP-A-2006-171464). Of these resins, triacetyl cellulose, polyethylene terephthalate and polyethylene naphthalate, especially triacetyl cellulose, are preferred over the others.

When the present antiglare film or antireflective film is used in a liquid crystal display, an adhesive layer is provided on one side of the film, and the resultant film is placed at the topmost surface of the display. Alternatively, the present antiglare film or antireflective film may be combined with a polarizing plate. Since the polarizing plate uses triacetyl cellulose film as protective film for its polarizing layer, it is advantageous in point of cost for the present antiglare film or antireflective film to be used as-is as the protective film when the transparent support thereof is triacetyl cellulose film.

When the present antiglare film or antireflective film is provided with an adhesive layer on one side and placed at the topmost surface of a display, or used as-is as protective film for a polarizing plate, it is appropriate for attainment of sufficient adhesion that saponification treatment be carried out after formation of the outermost layer on the transparent support. The saponification treatment can be carried out according to a known method. For instance, the treatment is performed by immersing the film in an alkali solution for an appropriate time. After immersion in an alkali solution, it is preferred that the film be thoroughly washed with water so as not to leave alkali component, or be immersed in a dilute acid to neutralize the alkali component.

By undergoing the saponification treatment, the transparent support is rendered hydrophilic on the side opposite to the side having the outermost layer.

<Coating Method>

The present antiglare film or antireflective film can be formed in accordance with the following methods, but the methods for formation thereof should not be construed as being limited to the following. First, coating solutions, which each contain ingredients to form each constituent layer of the film, are prepared. Then, the coating solutions prepared for forming various functional layers are coated on a transparent support by use of a dip coating method, an air-knife coating method, a curtain coating method, a roller coating method, a wire-bar coating method, a gravure coating method or a die coating method, and further heated and dried. Herein, the use of a microgravure coating method, a wire-bar coating method or a die coating method (see U.S. Pat. No. 2,681,294 and JP-A-2006-122889), especially a die coating method, is preferred.

Thereafter, each functional layer coated is exposed to light or heat, and undergoes curing by polymerization of monomer(s) contained therein. Thus, the functional layer is formed. Herein, two or more functional layers may be formed, if needed.

In the same manner as the above, a coating solution for forming a low refractive index layer is further coated on the functional layer(s), and subjected to light exposure or heating (cured by irradiation with ionizing radiation like ultraviolet radiation, preferably by irradiation with ionizing radiation under heating), thereby forming a low refractive index layer. Thus, the present antireflective film is obtained.

<Polarizing Plate>

A polarizing plate is made up mainly of a polarizing film and two protective films that protect both the front and back sides of the polarizing film. It is appropriate that the present antiglare film or antireflective film be used as at least one of the two protective films between which a polarizing film is sandwiched. By allowing the present antiglare film or antireflective film to function also as the protective film, the cost of making the polarizing plate can be reduced. In addition, by using the present antiglare film or antireflective film as the topmost layer of a polarizing plate, the polarizing plate can have excellent properties including prevention of surroundings' reflection and the like, scratch resistance, soil resistance and so on.

The surface rendered hydrophilic is effective particularly for improvement in adhesion to the polarizing film composed mainly of polyvinyl alcohol. In addition, the surface rendered hydrophilic is resistant to adhesion of dust in the air. So, when the antiglare film having the back rendered hydrophilic is bonded to the polarizing film, entry of dust into a gap between the antiglare film and the polarizing film can be minimized, and effective prevention of point defects traceable to dust can be attained.

It is appropriate that the saponification treatment be carried out so that the contact angle of water with respect to the transparent support surface on the side opposite to the side having the outermost layer reaches preferably 40° or below, more preferably 30° or below, particularly preferably 20° or below.

<Image Display Device>

The present antiglare film or antireflective film can be applied in image display devices, such as a liquid crystal display (LCD), a plasma display panel (PDP), an electroluminescent display (ELD), a cathode-ray tube (CRT) display and a surface-conduction electron-emitter display (SED). The particularly preferred application thereof is application in liquid crystal display (LCD) devices. Since the present antiglare film or antireflective film has a transparent support, it is used in a state of being bonded to the image display screen of an image display device on the side of its transparent support.

When the present antiglare film or antireflective film is used as one of the surface protective films for the polarizing film, the resultant polarizing plate is suitable for use in transmissive, reflective or semi-transparent liquid crystal display devices adopting various modes, such as twisted nematic (TN), super twisted nematic (STN), vertical alignment (VA), in-plane switching (IPS) and optically compensated bend cell (OCB) modes.

Examples

The invention is illustrated below in more detail by reference to the following examples, but these examples should not be construed as limiting the scope of the invention. Additionally, all parts and percentages in the following examples and comparative examples are by mass unless otherwise indicated.

The compositions of coating solutions 1 to 10 for antiglare layers are shown in Table 1. Each of the coating solutions for antiglare layers was made by preparing a solution of its corresponding composition shown in Table 1 and passing the solution through a polypropylene filter having a pore size of 30 μm. Additionally, the figures in Table 1 are values expressed in mass %.

The compounds used in each composition are described below.

PET-30: Mixture of pentaerythritol triacrylate and pentaerythritol tetraacrylate (produced by NIPPON KAYAKU Co., Ltd.)

Viscoat V-360: EO-modified trimethylolpropane triacrylate (produced by OSAKA ORGANIC CHEMICAL INDUSTRY LTD.)

Particle dispersion: MIBK (methyl isobutyl ketone) dispersion prepared by dispersing the particles chosen from those shown below for 20 minutes at 10,000 rpm by means of a POLYTRON dispersing machine Particle A: 8-μm cross-linked acrylic particles (average particle size: 8.0 μm, refractive index: 1.500)

Particle B: 10-μm cross-linked acrylic particles (average particle size: 10.0 μm, refractive index: 1.500)

Particle C: 12-μm cross-linked acrylic particles (average particle size: 12.0 μm, refractive index: 1.500)

Particle D: 5-μm cross-linked acrylic/styrene resin particles (average particle size: 5.0 μm, refractive index of core particle: 1.555, composition of shell layer: cross-linked polymethyl methacrylate, refractive index of shell layer: 1.500, thickness of shell layer: 100 nm)

Particle E: 8-μm cross-linked acrylic/styrene resin particles (average particle size: 8.0 μm, refractive index of core particle: 1.555, composition of shell layer: cross-linked polymethyl methacrylate, refractive index of shell layer: 1.500, thickness of shell layer: 100 nm)

Particle F: 5-μm cross-linked acrylic/styrene resin particles (average particle size: 5.0 μm, refractive index: 1.555)

Particle G: 6-μm cross-linked acrylic/styrene resin particles (average particle size: 6.0 μm, refractive index of core particle: 1.555, composition of shell layer: cross-linked polymethyl methacrylate, refractive index of shell layer: 1.500, thickness of shell layer: 100 nm)

IRGACURE 127: Polymerization initiator (produced by Ciba Specialty Chemicals Inc.)

CAB: Cellulose acetate butyrate

SP-13: Fluorine-containing surfactant (dissolved and used in the form of a 10 mass % MEK (methyl ethyl ketone) solution)

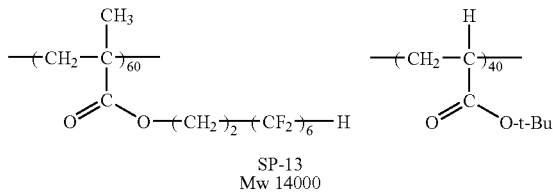

SP-13
Mw 14000

(Preparation of Coating Solution A for Medium Refractive Index Layer)

To 10.0 parts by mass of a particulate $ZrO_2$-containing hard coating agent (DeSolite Z7404 [refractive index: 1.72, solids concentration: 60 mass %, particulate zirconium oxide content: 70 mass % (on solids basis), average particle size of particulate zirconium oxide: about 20 nm, solvent composition: MIBK/MEK=9/1], produced by JSR Corporation), 3.0 parts by mass of a dipentaerythritol pentaacrylate-dipentaerythritol hexaacrylate mixture (DMA), 0.1 part by mass of a photopolymerization initiator (IRGACURE 184, produced by Ciba Specialty Chemicals Inc.) and 86.9 parts by mass of methyl isobutyl ketone were added and stirred, and thereto 0.1 part by mass of SP-13 was further added and thoroughly stirred. Then, the resultant mixture was filtered through a polypropylene filter having a pore size of 0.4 μm, thereby preparing a coating solution A for a medium refractive index layer.

(Preparation of Coating Solution A for High Refractive Index Layer)

To 15.0 parts by mass of a particulate $ZrO_2$-containing hard coating agent (DeSolite Z7404 [refractive index: 1.72, solids concentration: 60 mass %, particulate zirconium oxide content: 70 mass % (on solids basis), average particle size of particulate zirconium oxide: about 20 nm, solvent composition: MIBK/MEK=9/1], produced by JSR Corporation), 85.0 parts by mass of methyl isobutyl ketone was added, and stirred. The resultant mixture was filtered through a polypropylene filter having a pore size of 0.4 μm, thereby preparing a coating solution A for a high refractive index layer.

(Preparation of Coating Solution A for Low Refractive Index Layer)

<Preparation of Dispersion Liquid Containing Hollow Silica Particles>

To 500 parts by mass of hollow particulate silica sol (isopropyl alcohol silica sol CS60-IPA produced by JGC C&C, average particle size: 60 nm, shell thickness: 10 nm, silica concentration: 20%, refractive index of silica particles: 1.31), 20 parts by mass of acryloyloxypropyltrimethoxysilane and 1.5 parts by mass of diisopropoxyaluminum ethyl acetate were added, and mixed together. Thereto, 9 parts by mass of ion exchange water was further added. The resulting mixture was subjected to reaction at 60° C. for 8 hours, then cooled down to room temperature, and further admixed with 1.8 parts by mass of acetyl acetone, thereby preparing a dispersion liquid. Thereafter, the dispersion liquid was subjected to solvent substitution by distillation under reduced pressure of 30 Torr as cyclohexanone was added thereto so as to keep the silica content almost constant, and finally concentration adjustment was carried out, thereby preparing a dispersion liquid having a solid concentration of 18.2%. The residual IPA content in the dispersion liquid obtained was found to be at most 0.5% when analysis was performed by gas chromatography.

By using the thus obtained dispersion liquid of hollow silica particles, a coating solution A having the following composition was prepared for the purpose of forming a low refractive index layer.

Composition of Coating Solution A for Low Refractive Index Layer:

| | |
|---|---|
| DPHA | 1.0 part by mass |
| P-1 | 1.6 parts by mass |
| Dispersion liquid of hollow silica particles (18.2%) | 26.4 parts by mass |
| RMS-033 | 0.4 part by mass |
| IRGACURE 907 | 0.3 part by mass |

| | |
|---|---|
| M-1 | 1.9 parts by mass |
| MEK | 168.4 parts by mass |

P-1: Fluorine-containing copolymer P-3 disclosed in JP-A-2004-45462 (mass-average molecular weight: about 50,000)
DPHA: Mixture of dipentaerythritol pentaacrylate and dipentaerythritol hexaacrylate (produced by NIPPON KAYAKU Co., Ltd.)
IRGACURE 907: Polymerization initiator (produced by Nihon Ciba-Geigy K.K.)
M-1: Fluorine-containing multifunctional acrylate

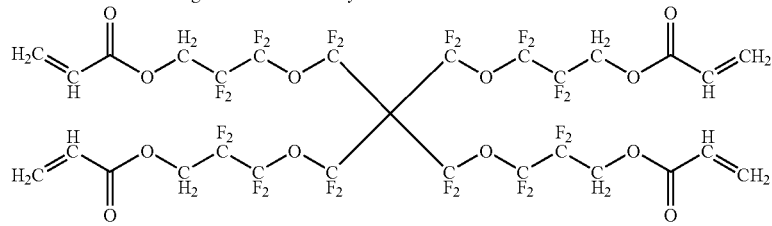

M-1

RMS-033: Methacryloxy-modified silicone (produced by Gelest, Inc.)

Example 1

<Making of Antiglare Film Samples 101 to 112>
(1) Coating of Antiglare Layer:

While a roll of 80 μm-thick triacetyl cellulose film (TAC-TD80U, a product of FUJIFILM Corporation) was being wound off, each of the antiglare layer coating solutions shown in Table 2 was coated on the film in accordance with the die coating method using the slot die disclosed in Example 1 of JP-A-2006-122889. Herein, the coating operation was performed at a transport speed of 30 m/min, and the layer coated was dried at 60° C. for 150 seconds, and further cured by irradiation with ultraviolet light from a 160 W/cm air-cooled metal halide lamp (made by Eyegraphics Co., Ltd.) in an exposure dose of 100 mJ/cm$^2$, at an illumination of 400 mW/cm$^2$ under an atmosphere having an oxygen concentration reduced to about 0.1% by the purge using nitrogen, and then wound into a roll. Herein, the amount of each coating solution applied was adjusted so that the thickness of each antiglare layer formed became the value shown in Table 2. Thus, Samples 101 to 112 as shown in Table 2 were made.

On each of the antiglare layers 101 to 112, the coating solution A for a medium refractive index layer, the coating solution A for a high refractive index layer and the coating solution A for a low refractive index layer were coated by direct extrusion with a coater having slot dies so as to reach a thickness of 60 nm, a thickness of 111 nm and a thickness of 89 nm, respectively. Herein, the coating operation was performed at a transport speed of 30 m/min, and the layers coated were dried at 90° C. for 75 seconds, and further irradiated with ultraviolet light from a 240 W/cm air-cooled metal halide lamp (made by Eyegraphics Co., Ltd.) in an exposure dose of 240 mJ/cm$^2$, at an illumination of 400 mW/cm$^2$ under an atmosphere having an oxygen concentration reduced to 0.01 to 0.1% by the purge using nitrogen. Thus, Samples 101 to 112 were made. As to the amount of the coating solution used for formation of each layer, the amount required for the coating solution to attain the intended thickness on PET film was adopted as it was in coating the coating solution on each antiglare layer also. The thickness on PET film was worked out by measurement with a Reflective Film Thickness Monitor FE-3000 (made by OTSUKA ELECTRONICS CO., LTD.). Additionally, when refractive index measurement with an Abbe refractometer (made by ATAGO CO., LTD.) was performed on each layer formed in a thickness of about 4 μm by coating each coating solution on a glass plate, it was found that the refractive indices of the layers formed were 1.62, 1.72 and 1.36, respectively.

(Saponification Treatment of Antiglare Antireflective Film)

After the coating, each sample was subjected to the following treatment. A 1.5 mol/L aqueous solution of sodium hydroxide was prepared, and kept at 55° C. In addition, a 0.01 mol/L dilute aqueous solution of sulfuric acid was prepared, and kept at 35° C. The antiglare antireflective films made were immersed in the aqueous solution of sodium hydroxide for 2 minutes, and then immersed in water so that the aqueous solution of sodium hydroxide was flushed out with water. Next, the resultant films were immersed in the dilute aqueous solution of sulfuric acid for 1 minute, and then immersed in water so that the dilute aqueous solution of sulfuric acid was flushed out with water. Finally, the samples were well dried at 120° C. In this manner, antireflective films having undergone saponification treatment (Samples 101 to 112) were made.

(Making of Polarizing Plate)

A polarizing plate was made by bonding 80 μm-thick triacetyl cellulose film (TAC-TD80U, produced by FUJIFILM Corporation) having undergone 2-minute immersion in a 1.5 mol/L aqueous NaOH solution kept at 55° C., neutralization and washing and each of the antireflective films having undergone the saponification treatment (Samples 101 to 112) to both sides of a polarizing film made by stretching iodine-adsorbed polyvinyl alcohol film, respectively, thereby protecting the polarizing film.

(Evaluation of Antireflective Film)

Evaluations of various characteristics were made on the antireflective films in accordance with the following methods. Results obtained are shown in Table 3.

(Reflectance)

The back of each antireflective film was roughened with sand paper, and treated with black ink to avoid back reflection in this state, the antireflective film surface was mounted on the integrating sphere of a spectrophotometer V-550 (made by JASCO Corporation) and examined for reflectance (integrated reflectance and specular reflection factor) in the wavelength region of 380 to 780 nm. And the arithmetic mean of reflectance values in the wavelength region of 450 to 650 nm was calculated, whereby the antireflective characteristic was evaluated.

(Haze)

[1] Each of the antireflective films made was measured for the total haze value (H) in conformance with JIS-K7136.

[2] Several drops of silicone oil were put on either side of each antireflective film, and the resultant film was sandwiched between two 1 mm-thick glass plates (Micro Slide Glass, product number S 9111, made by MATSUNAMI GLASS IND., LTD.) so that the two glass plates and the antireflective film were brought into optically absolute contact with one another. Under the surface-haze removal condition thus created, haze measurement was made. Separately, silicone oil alone was inserted between the same two glass plates as used in the foregoing measurement, and thereon a haze measurement was made. The internal haze (Hi) was determined as a difference between these two haze values measured.

[3] The surface haze (Hs) was calculated by subtraction of the internal haze (Hi) determined in [2] from the total haze (H) measured in [1].

(Evaluation of Surface Shape)

The surface shape of each of the films obtained was evaluated from an arithmetic average roughness (Ra) of the uneven surface and an average interval (Sm) between asperities on the surface which were determined on the basis of JIS 13-0601 by use of a two-dimensional surface roughness measuring machine SJ-400 made by Mitsutoyo Corporation. In the measurements, the cut-off value was set at 0.8 mm.

(Slope Angle $\theta$)

The antireflective films according to the invention have microscopically uneven structures on their surfaces. In the invention, the distribution of slope angles $\theta$ is determined by the following method. Specifically, assuming the apexes of a triangle having an area of 0.5 to 2 $\mu m^2$ on the plane of a transparent film substrate, a slope angle $\theta$ of a film surface is defined as an angle which the normal line of a triangle plane formed by three intersection points of three perpendicular lines extended upwardly and vertically from the apexes forms with the perpendicular line extended upwardly and vertically from the substrate. The area of at least 250,000 $\mu m^2$ (0.25 $mm^2$) on the substrate is divided into the assumed triangles, and slope angle measurements are made on all of the divided triangles and thereby the distribution of slope angles at all the measuring points is determined.

Figure 1B:
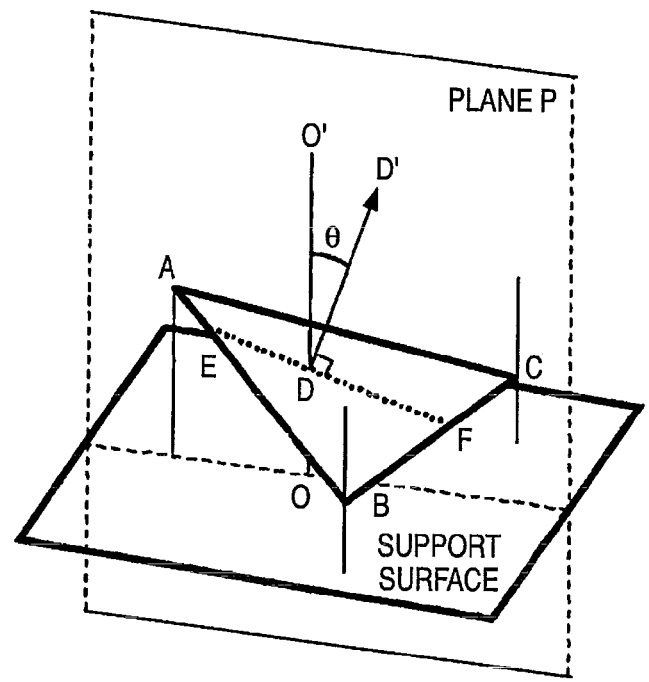
Figure 1C:
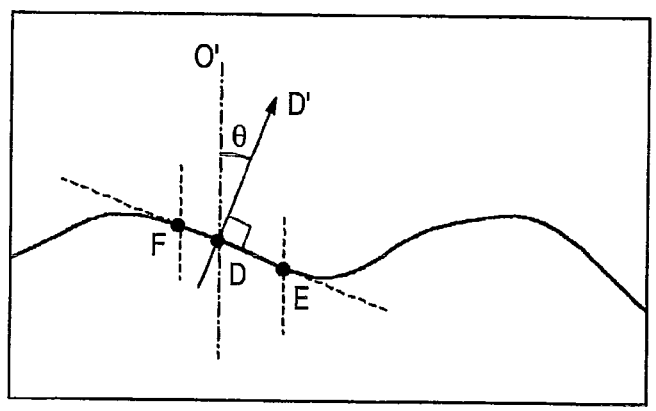
Figure 2:
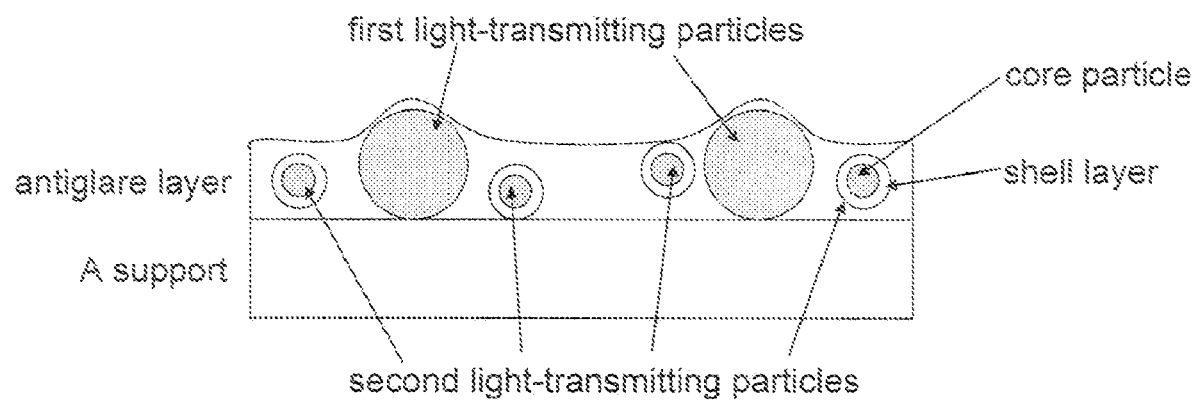
FIG. 2 is a diagram showing one example of the antiglare film of the present invention.

The method for measuring a slope angle is illustrated in detail by reference to FIG. 1. As shown in FIG. 1(a), the film is divided into meshes measuring 0.5 to 2 $\mu m^2$ in area. FIG. 1(b) is a diagram showing three points taken from a divided mesh. Perpendicular lines are extended upwardly and vertically from three points on this support, and the intersection points of these perpendicular lines and the film surface are symbolized by A, B and C. The angle $\theta$ that the normal line DD' to the plane of the triangle ABC forms with the perpendicular line OO' extended upwardly and vertically from the support is defined as a slope angle. FIG. 1(c) is a cross-sectional diagram of the film cut by the plane P including the points O'DD'. The line segment EF is an intersection line of the triangle ABC and a plane P. The measuring area is preferably 250,000 $\mu m^{22}$ (0.25 $mm^2$) or above on the support, and this area is divided into triangles on the support, and subjected to measurements for determination of slope angles. Although there are some slope-angle measuring devices, an example thereof is described below. Specifically, the case of using as the measuring device an SXM520-AS150 Model made by Micromap Corporation (USA) is explained below. When the power of an objective lens used is e.g. 10×, the slope-angle measuring unit is 0.8 $\mu m^2$ and the measuring range is 500,000 $\mu m^2$ (0.5 $mm^2$) When the objective lens having a greater power is used, the measuring unit and the measuring range become the smaller in keeping with the power increment. The data obtained by measurement is analyzed by software such as MAT-LAB, from which the distribution of slope angles can be calculated. The incidence of the measured slope angles $\theta$ in a range of $0°<\theta<5°$ is expressed as $\theta(0.5)$.

(Antiglare Capability)

After the back of each antiglare film was filled with black color by use of a black felt-tip pen, the antiglare film was stuck to a glass plate, light of a fluorescent lamp was made to bounce off the surface of the antiglare film, and the blurry appearance of the edge of the fluorescent lamp seen in the antiglare film was evaluated.

A: The edge appears blurred to a sufficient extent, and the outline cannot be recognized to be linear.

B: The outline can be recognized to be somewhat linear, but such an edge appearance is not obtrusive at all.

C: The shape of the fluorescent lamp is plainly seen in the antiglare film, which is obtrusive.

Ranks equal to and higher than B are regarded as acceptable.

(Denseness of Black)

After the back of each antiglare film was filled with black color by use of a black felt-tip pen, the resultant antiglare film was stuck to a glass plate, and thereon visual evaluation was performed by using a liquid crystal display put into the black-display mode in a room lit at 1,000 lux. The evaluation criteria are as follows.

A: Blackness of the screen is seen deep, and there is no whitish feel.

B: Blackness of the screen is not seen so deep, and there is a rather obtrusive whitish feel.

C: The screen has an obtrusive whitish feel.

(Rough Feel of Surface)

After the back of each antiglare film was filled with black color by use of a black felt-tip pen, the resultant antiglare film was stuck to a glass plate, and a rough feel of the uneven surface that comes from resin particles was evaluated.

A: The surface has no obtrusive rough feel.

B: The surface has a rather obtrusive rough feel.

C: The surface has an obtrusive rough feel, and its roughness exceeds the acceptable level.

(Glitter)

Each of the polarizing plates made was mounted on the liquid-crystal TV set of 133 ppi, and the extent of glitter (brightness variations traceable to the lens effect produced by asperities on the antiglare antireflective film surface) was visually checked and rated in accordance with the following criteria.

A: No glitter is observed at all.

B: Almost no glitter is observed.

C: Annoying glitter is observed.

Evaluation results are shown in Table 3.

TABLE 1

(all figures are in mass %)

| | Coating Soln. 1 | Coating Soln. 2 | Coating Soln. 3 | Coating Soln. 4 | Coating Soln. 5 | Coating Soln. 6 | Coating Soln. 7 | Coating Soln. 8 | Coating Soln. 9 | Coating Soln. 10 |
|---|---|---|---|---|---|---|---|---|---|---|
| PET-30 | 28.34 | 28.48 | 28.42 | 28.02 | 27.71 | 28.34 | 28.34 | 28.34 | 28.34 | 30.86 |
| Viscoat V-360 | 15.26 | 15.33 | 15.30 | 15.09 | 14.92 | 15.26 | 15.26 | 15.26 | 15.26 | 16.62 |
| Particle 1 (30% MIBK) | 0.83 | 0.08 | 0.42 | 2.50 | 4.17 | 0.83 | 0.83 | 0.83 | 0.83 | 0.83 |
| Particle 2 (30% MIBK) | 13.33 | 13.33 | 13.33 | 13.33 | 13.33 | 13.33 | 13.33 | 13.33 | 13.33 | 0.00 |
| IRGACURE 127 | 1.35 | 1.36 | 1.35 | 1.33 | 1.32 | 1.35 | 1.35 | 1.35 | 1.35 | 1.47 |
| MIBK | 27.58 | 28.11 | 27.88 | 26.42 | 25.25 | 27.58 | 27.58 | 27.58 | 27.58 | 36.92 |
| MEK | 12.50 | 12.50 | 12.50 | 12.50 | 12.50 | 12.50 | 12.50 | 12.50 | 12.50 | 12.50 |
| SP-13 | 0.06 | 0.06 | 0.06 | 0.06 | 0.06 | 0.06 | 0.06 | 0.06 | 0.06 | 0.06 |
| CAB | 0.75 | 0.75 | 0.75 | 0.75 | 0.75 | 0.75 | 0.75 | 0.75 | 0.75 | 0.75 |
| Particle 1 | Particle A | Particle A | Particle A | Particle A | Particle A | Particle A | Particle A | Particle A | Particle B | Particle C | Particle A |
| Particle 2 | Particle D | Particle D | Particle D | Particle D | Particle D | Particle D | Particle E | Particle F | Particle G | Particle E | Not added |

TABLE 2

| | Thickness (μm) | First Light-transmitting Particles | | | Second Light-transmitting Particles | | | Sample No. | Coating Solution for Antiglare layer |
|---|---|---|---|---|---|---|---|---|---|
| | | Particle Species | Particle Size (μm) | Amount added (wt %) | Particle Species | Particle Size (μm) | Amount added (wt %) | | |
| Invention | 7.5 | A | 8 | 0.5 | D | 5 | 8 | 101 | 1 |
| Invention | 7 | A | 8 | 0.5 | D | 5 | 8 | 102 | 1 |
| Comparative Example | 5.2 | A | 8 | 0.5 | D | 5 | 8 | 103 | 1 |
| Comparative Example | 7.5 | A | 8 | 0.05 | D | 5 | 8 | 104 | 2 |
| Invention | 7.5 | A | 8 | 0.25 | D | 5 | 8 | 105 | 3 |
| Invention | 7.5 | A | 8 | 1.5 | D | 5 | 8 | 106 | 4 |
| Comparative Example | 7.5 | A | 8 | 2.5 | D | 5 | 8 | 107 | 5 |
| Comparative Example | 7.5 | A | 8 | 0.5 | E | 8 | 8 | 108 | 6 |
| Comparative Example | 7.5 | A | 8 | 0.5 | F | 5 | 8 | 109 | 7 |
| Invention | 9.5 | B | 10 | 0.5 | G | 6 | 8 | 110 | 8 |
| Invention | 11.5 | C | 12 | 0.5 | E | 8 | 8 | 111 | 9 |
| Comparative Example | 7.5 | A | 8 | 0.5 | Not added | — | — | 112 | 10 |

TABLE 3

| | Sample No. | Average Integrated Reflectance (%) | Average Specular Reflectance (%) | Surface Haze (%) | Internal Haze (%) | Ra (μm) | Sm (μm) | θ(0.5) (°) | Antiglare Capability | Deep Black Feel | Rough Feel of Surface | Glitter |
|---|---|---|---|---|---|---|---|---|---|---|---|---|
| Invention | 101 | 0.8 | 0.4 | 0.5 | 9.2 | 0.07 | 420 | 75 | A | A | A | A |
| Invention | 102 | 0.9 | 0.4 | 0.6 | 8.5 | 0.08 | 330 | 70 | A | A | A | A |
| Comparative Example | 103 | 1.6 | 1.2 | 10.0 | 6.2 | 0.35 | 50 | 28 | A | C | A | C |
| Comparative Example | 104 | 0.7 | 0.4 | 0.4 | 9.1 | 0.04 | 800 | 80 | C | A | C | A |
| Invention | 105 | 0.8 | 0.4 | 0.5 | 9.2 | 0.06 | 550 | 72 | A | A | A | A |
| Invention | 106 | 0.9 | 0.5 | 1.0 | 9.4 | 0.12 | 300 | 55 | A | B | A | B |
| Comparative Example | 107 | 1.5 | 1.2 | 3.0 | 9.6 | 0.20 | 190 | 38 | A | C | A | C |
| Comparative Example | 108 | 1.9 | 1.1 | 8.0 | 11.2 | 0.40 | 60 | 30 | A | C | A | C |
| Comparative Example | 109 | 1.8 | 1.1 | 5.0 | 8.3 | 0.30 | 75 | 33 | A | C | A | C |

TABLE 3-continued

| | Sample No. | Average Integrated Reflectance (%) | Average Specular Reflectance (%) | Surface Haze (%) | Internal Haze (%) | Ra (μm) | Sm (μm) | θ(0.5) (°) | Antiglare Capability | Deep Black Feel | Rough Feel of Surface | Glitter |
|---|---|---|---|---|---|---|---|---|---|---|---|---|
| Invention | 110 | 0.8 | 0.4 | 0.5 | 10.5 | 0.09 | 520 | 78 | A | A | A | A |
| Invention | 111 | 0.8 | 0.4 | 0.5 | 11 | 0.09 | 610 | 80 | A | A | A | A |
| Comparative Example | 112 | 0.7 | 0.4 | 0.3 | 0.5 | 0.06 | 550 | 84 | A | A | A | C |

As can be seen from the above data, the antireflective films according to the invention were low in reflectance, invested with internal scatter capability, and superior in antiglare capability, denseness of black and glitter prevention; as a consequence, when used in polarizing plates and image display devices, they delivered excellent properties.

Example 2

When each of the film samples made in Example 1 in accordance with the invention was bonded to the glass plate of an organic EL display surface via an adhesive, the amount of light reflected off the glass plate surface was reduced and the resultant display delivered better viewability.

Example 3

A polarizing plate having on one side the antireflective film formed using each of the film samples made in Example 1 in accordance with the invention was made, and to the other side of the polarizing plate, or the side opposite to the antireflective film side, a λ/4 plate was bonded. The thus made polarizing plate was bonded to the glass plate of an organic EL display surface so that the antireflective film lay at the topmost surface. As a result, surface reflections and reflections from the inside of the surface glass were cut, and the display extremely high in viewability was obtained.

According to the invention, an antiglare film having excellent anti-glare and anti-glitter properties and ensuring high denseness of black can be offered. And an antireflective film not only ensuring excellent anti-glare and anti-glitter properties and high denseness of black but also having low reflectance values can also be offered. Moreover, the invention can offer antireflective films, polarizing plates and image display devices each incorporating the antiglare film having the foregoing excellent properties.

The entire disclosure of each and every foreign patent application from which the benefit of foreign priority has been claimed in the present application is incorporated herein by reference, as if fully set forth.

What is claimed is:

1. An antiglare film, comprising:
   a support; and
   an antiglare layer including a surface that has asperities, wherein:
   the antiglare layer contains at least two kinds of light-transmitting particles including first light-transmitting particles and second light-transmitting particles,
   the first light-transmitting particles have an average particle size that is 0.01 to 2.5 μM greater than an average thickness of the antiglare layer,
   the second light-transmitting particles have an average particle size that is at least 0.1 μm smaller than the average thickness of the antiglare layer,
   the first light-transmitting particles are contained in an amount of 0.1 to 2 mass % based on a total solid content in the antiglare layer,
   the second light-transmitting particles are contained in an amount of 2 to 30 mass % based on the total solid content in the antiglare layer,
   the second light-transmitting particles include organic polymer-containing particles, each of the organic polymer-containing particles has a double structure having a core part and a shell part, in which a core particle and a shell layer are contained, and
   the shell layer of each of the organic polymer-containing particles has a thickness of 10 nm to 2,000 nm.

2. The antiglare film according to claim 1,
   wherein the first light-transmitting particles are contained in an amount of 0.1 to 1 mass % based on the total solid content in the antiglare layer.

3. The antiglare film according to claim 1,
   wherein a refractive index $n_1$ is higher than a refractive index $n_2$, where the refractive index $n_1$ represents a refractive index of the core particle and the refractive index $n_2$ represents a refractive index of the shell layer, and
   the refractive index $n_1$ is from 1.54 to 1.65.

4. The antiglare film according to claim 3,
   wherein the refractive index $n_2$ is from 1.46 to 1.53.

5. The antiglare film according to claim 1,
   wherein the shell layer contains at least one polymer selected from the group consisting of polymers of acrylic acid esters, polymers of methacrylic acid esters, and copolymers of acrylic acid esters and methacrylic acid esters.

6. The antiglare film according to claim 1,
   wherein the antiglare layer is formed of a polymer, a copolymer or a mixed polymer of the polymer and the copolymer,
   the polymer and the copolymer are formed from at least one of following (A1) and (A2);
   (A1): an alkyl acrylate having an alkyl group that has at least a group selected from the group consisting of a hydroxyl group and an acryloyl group, and
   (A2): an alkyl methacrylate having an alkyl group that has at least a group selected from the group consisting of a hydroxyl group and an acryloyl group.

7. The antiglare film according to claim 1,
   wherein the second light-transmitting particles include particles, that have sizes at least 2 μm greater than the average particle size of the second light-transmitting particles, in a proportion of 0.01% or below based on a total amount of the second light-transmitting particles.

8. The antiglare film according to claim 1,
   wherein the surface of the antiglare film having the asperities has an arithmetic average roughness Ra within a range of 0.03 μm<Ra<0.4 μm, the asperities have an average interval Sm within a range of 80 μm<Sm<700 μM, and a region θ(0.5) in which slope angles θ of the asperities lie within a range of 0°<θ<0.5° constitutes at least 40% of the surface of the antiglare layer.

9. The antiglare film according to claim 1, which has an internal haze value of 5% to 90%.

10. The antiglare film according to claim 1, which has a surface haze value of 2% or below.

11. An antireflective film, comprising:
the antiglare film according to claim 1; and
a low refractive index layer on or above the antiglare layer of the antiglare film, the low refractive index layer having a refractive index lower than a refractive index of the antiglare layer.

12. The antireflective film according to claim 11, further comprising:
a high refractive index layer between the antiglare layer and the low refractive index layer, the high refractive index layer having a refractive index higher than the refractive index of the antiglare layer.

13. The antireflective film according to claim 12, further comprising:
a medium refractive index layer between the antiglare layer and the high refractive index layer,
wherein the medium refractive index layer has a refractive index higher than the refractive index of the antiglare layer and lower than the refractive index of the high refractive index layer.

14. The antireflective film according to claim 11, which has an integrated reflectance of 1.5% or below.

15. A polarizing plate, comprising:
protective films; and
a polarizing film provided between the protective films,
wherein at least one of the protective films is the antiglare film according to claim 1.

16. An image display device, comprising;
a display; and
the antiglare film according to claim 1 provided at outermost surface of the display.

17. An antiglare film, comprising:
a support; and
an antiglare layer including a surface that has asperities, wherein:
the antiglare layer contains at least two kinds of light-transmitting particles including first light-transmitting particles and second light-transmitting particles,
the first light-transmitting particles have an average particle size that is 0.01 to 2.5 μm greater than an average thickness of the antiglare layer,
the second light-transmitting particles have an average particle size that is at least 0.1 μm smaller than the average thickness of the antiglare layer,
the first light-transmitting particles are contained in an amount of 0.1 to 2 mass % based on a total solid content in the antiglare layer,
the second light-transmitting particles are contained in an amount of 2 to 30 mass % based on the total solid content in the antiglare layer,
the second light-transmitting particles include organic polymer-containing particles, each of the organic polymer-containing particles has a double structure having a core part and a shell part, in which a core particle and a shell layer are contained, and
the second light-transmitting particles include particles that have sizes at least 2 μm greater than the average particle size of the second light-transmitting particles, in a proportion of 0.01% or below based on a total amount of the second light-transmitting particles.

* * * * *